(12) United States Patent
Hamai et al.

(10) Patent No.: US 6,184,603 B1
(45) Date of Patent: Feb. 6, 2001

(54) MOTOR/GENERATOR UNIT APPLICABLE TO AUTOMOTIVE VEHICLE

(75) Inventors: Kyugo Hamai; Satoshi Taniuchi, both of Kanagawa (JP)

(73) Assignee: Unisia Jecs Corporation, Atsugi (JP)

( * ) Notice: Under 35 U.S.C. 154(b), the term of this patent shall be extended for 0 days.

(21) Appl. No.: 09/536,741

(22) Filed: Mar. 28, 2000

(30) Foreign Application Priority Data

Mar. 29, 1999 (JP) .................................................. 11-085378

(51) Int. Cl.[7] ...................................................... H02K 7/10
(52) U.S. Cl. ........................... 310/75 R; 310/78; 310/92; 310/96; 180/65.2; 477/3
(58) Field of Search ..................... 310/75 R, 78, 310/80, 92, 96, 98, 101, 102 R, 103, 108, 109, 112, 113, 100; 180/65.1, 65.2, 65.6, 364; 60/718; 477/3

(56) References Cited

U.S. PATENT DOCUMENTS

| | | | |
|---|---|---|---|
| 5,562,565 | * 10/1996 | Moroto et al. | 180/65.6 |
| 5,844,342 | * 12/1998 | Miyatani et al. | 310/114 |
| 5,924,395 | 7/1999 | Moriya et al. | 123/90.15 |
| 5,934,395 | 8/1999 | Koide et al. | 180/65.2 |
| 5,944,628 | 8/1999 | Lee | 475/214 |

FOREIGN PATENT DOCUMENTS

| | | |
|---|---|---|
| 7-123509 | 5/1995 | (JP) . |
| 10-225058 | 8/1998 | (JP) . |

* cited by examiner

Primary Examiner—Burton Mullins
(74) Attorney, Agent, or Firm—Foley & Lardner

(57) ABSTRACT

A motor/generator unit applicable to an automotive vehicle is disclosed. The motor/generator unit includes: a torque converter (102a) to perform a transmission of a driving force between an output axle of a vehicular engine and an input axle of a transmission, the transmission being enabled to switch between a neutral state and a forward-and-rearward state and being enabled to vary a gear ratio; a housing (5) enclosing a periphery of the torque converter; a hydraulic clutch; an electromagnetic clutch, both (102c) of the hydraulic clutch and electromagnetic clutch being juxtaposed to be enabled to form a lock-up state of the torque converter; and a motor/generator (102b) including a stator (1) fixed to the housing and a rotor (8) attached to a rotary element of the torque converter so as to be opposed to the stator, the motor/generator being disposed to be enabled to give and receive a torque to and from the rotary element of the torque converter.

20 Claims, 25 Drawing Sheets

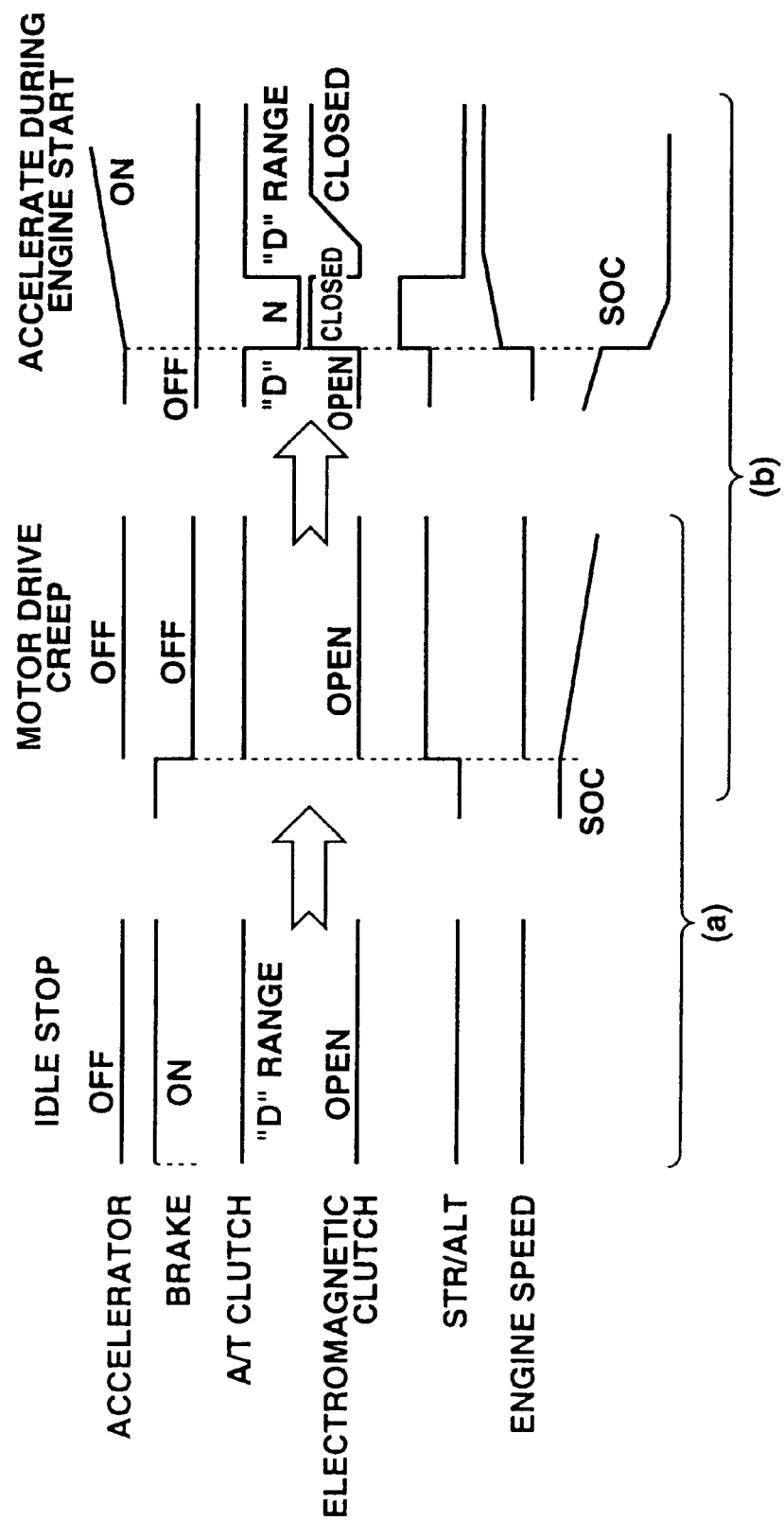

MOTOR/GENERATOR UNIT APPLICABLE TO AUTOMOTIVE VEHICLE

BACKGROUND OF THE INVENTION a) Field of the Invention

The present invention relates to a motor/generator unit having a motor/generator constructed so as to be enabled to give and receive a torque to and from rotary elements of a torque converter interposed between an engine and a transmission.

b) Description of the Related Art

Recently, in automotive vehicles, a fuel economy improvement has been demanded from standpoints of environment protection and limited resources.

One of techniques to improve the fuel economy includes a motor/generator installation in a vehicular engine driving force transmission system. For example, the motor/generator performs a regeneration such as to convert a running energy into an engine torque by means of an output torque of the motor/generator.

A Japanese Patent Application First Publication No. Heisei 7-123509 published on May 12, 1995 exemplifies a first previously proposed motor/generator unit.

A Japanese Patent Application First Publication No. Heisei 10-225058 published on Aug. 21, 1998 exemplifies a second previously proposed motor/generator unit.

In the first previously proposed motor/generator unit, the motor/generator is installed so as to be enabled to give and receive the torque to and from an output axle of the engine. If a power margin is left in a vehicular battery power, the motor/generator is caused to function as a motor to assist a driving force of the engine. During a braking, the motor/generator is caused to function as a power generator to regenerate the power from the running energy in a range not exceeding a battery power. Using a conventional power train of the vehicle, the fuel economy improvement is, thus, made.

The second previously proposed motor/generator unit has been applied to, so-called, a hybrid vehicle. The hybrid vehicle includes the engine, a clutch motor, and an assistance motor, drives of these engine and motors being controlled to be enabled to carry out efficient operations of the generation of the running energy, the power generation during the vehicular run, and the regeneration during the braking.

SUMMARY OF THE INVENTION

In the first previously proposed motor/generator unit, a manual transmission has been used as a transmission although there are few modifications made to an already present and normally available power train.

In a case where the regeneration is started during a vehicular deceleration, a brake force corresponding to the regeneration is added to that corresponding to an engine braking so that the brake force accordingly becomes magnified and a disagreeable feeling of a vehicular drive is given to a vehicular driver.

In addition, in a case where the first previously proposed motor/generator unit is applied to a torque converter equipped automatic transmission which is major in current automotive vehicles as the transmission, a transmission of an input torque from a drive wheel side is not carried out between a turbine runner connected to an input axle of the transmission and a torque converter cover connected to an input axle of the engine so that it becomes impossible for the motor/generator to carry out the regeneration during the vehicular deceleration.

Furthermore, a starter to start the engine and an alternator to generate the electric power to be used in the vehicle are additionally required in the case of the application of the first previously proposed motor/generator unit to the vehicle. Hence, an increase in a vehicular weight is introduced This alternator always provides a load against the engine. Even if a voltage across the battery is sufficient, the power generation by the alternator is carried out. Hence, this arrangement described above gives a disadvantage to the improvement in fuel economy.

Furthermore, electrical parts to be mounted in the vehicle due to a demand of recent high-level technology have been increased. Together with the increase in the electrical parts, such a proposal that electromagnetic actuators are used to operate such vehicular air conditioner and power steering mechanism as those parts whose power has been obtained from the engine via its crankshaft and a belt has been made in order to improve the fuel economy. Therefore, there is a tendency of the increase in a vehicular battery load. To cope with the tendency of the increase in the vehicular battery load, it is expected that the battery voltage is increased from normal 12 volts to about 42 volts. Therefore, although it is necessary to increase a capacity of the alternator, it is unreasonable to increase the capacity of the alternator as separate from the motor/generator.

In addition, if the alternator having the large capacity is always operated by means of the engine, a fuel consumption becomes accordingly increased.

In the hybrid vehicle to which the second previously proposed motor/generator unit is applied, the drive of the engine, the clutch motor, and the assistance motor are controlled so that the vehicular run by means of the motor drive and the engine output torque assistance, and the generation and regeneration of the clutch motor and the assistance motor can efficiently be carried out.

However, in the hybrid vehicle to which the second previously proposed motor/generator unit is applied, the power train configuration is quite different from those having already present and normally available engine and transmission.

Hence, since it is impossible to utilize the already present and normally available power train and use a normally available assembly line, the second previously proposed motor/generator unit becomes extremely expensive.

It is, therefore, an object of the present invention to provide a novel and inexpensive motor/generator unit for an automotive vehicle which can utilize the already present and normally available power train, can utilize the already present and normally available production line, can eliminate both of the exclusively-used stator and alternator which would introduce a reduction of the fuel economy, and can improve a generation capacity and a regeneration ability.

The above-described object can be achieved by providing a motor/generator unit for an automotive vehicle, comprising: a torque converter to perform a transmission of a driving force between an output axle of a vehicular engine and an input axle of a transmission, the transmission being enabled to switch between a neutral state and a forward-and-rearward state and being enabled to vary a gear ratio; a housing enclosing a periphery of the torque converter; a hydraulic clutch; an electromagnetic clutch, both of the hydraulic clutch and electromagnetic clutch being juxtaposed to be enabled to form a lock-up state of the torque converter; and a motor/generator including a stator fixed to the housing and a rotor attached to a rotary element of the torque converter so as to be opposed to the stator, the motor/generator being disposed to be enabled to give and receive a torque to and from the rotary element of the torque converter.

BRIEF DESCRIPTION OF THE DRAWINGS

FIG. 16 is an integrally timing chart for explaining a series of operation from an engine idling stop to the motor creep, and the start-and-acceleration processing in the case of the first preferred embodiment.

DETAILED DESCRIPTION OF THE PREFERRED EMBODIMENTS

Reference will hereinafter be made to the drawings in order to facilitate a better understanding of the present invention.

Figure 1:
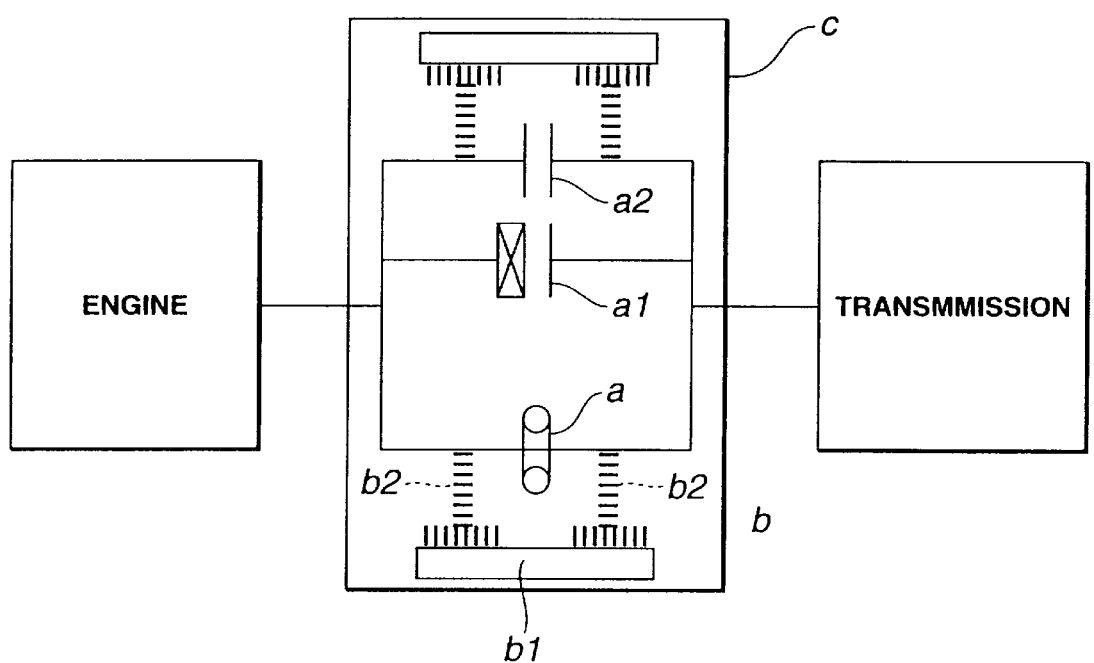
FIG. 1 is a basic configuration view of a motor/generator unit for an automotive vehicle according to the resent invention.

FIG. 1 shows a basic concept of a motor/generator unit applicable to an automotive vehicle according to the present invention.

As shown in FIG. 1, the motor/generator unit is interposed between an output axle of a vehicular engine and an input axle of a transmission. The motor/generator unit includes: a torque converter a to perform a transmission of a driving force between an output axle of a vehicular engine and an input axle of a transmission, the transmission being enabled to switch between a neutral state and a forward-and-rearward state and being enabled to vary a gear ratio; a housing c enclosing a periphery of the torque converter; a hydraulic clutch a2; an electromagnetic clutch a1, both of the hydraulic clutch and electromagnetic clutch being juxtaposed to be enabled to form a lock-up state of the torque converter; and a motor/generator b having a stator b1 fixed to an inner periphery of the housing and a rotor b2 attached to a rotary element of the torque converter a so as to be opposed to the stator, the motor/generator being disposed to be enabled to give and receive a torque to and from the rotary element of the torque converter a.

When the engine is tried to be started, the motor/generator b is caused to function as an electric motor. In this case, when the motor/starter b is installed on the output axle of the engine to the clutches a1 and a2, the output axle of the engine is revolved by means of the motor/generator b irrespective of engagements or release of both clutches a1 and a2. On the other hand, in a case where the motor/generator b is relatively disposed on the input axle of the transmission with respect to both clutches a1 and a2, a torque generated from the motor/generator b is transmitted to the output axle of the engine by the engagement of the electromagnetic clutch a1 to revolve the output axle of the engine. In this way, the motor/generator b is caused to revolve the output axle of the engine to start the engine. That is to say, the motor/generator b is caused to function as a generator to enable to be used as the alternator.

In addition, if it is functioned as the electric motor, the driving force of the engine can be assisted. In a case where, during the engine drive, the torque converter a is tried to be in the lock-up state, both hydraulic and electromagnetic clutch a2 and a1 are engaged. Thus, a high clutching force can be achieved.

Furthermore, in a case where a power regeneration is carried out during the vehicular run, at least the electromagnetic clutch a1 is engaged. At this time, the torque is inputted to the motor/generator b so that the regeneration energy can be picked up.

On the other hand, in a case where the motor/generator b is relatively disposed on an input axle of the transmission with respect to both clutches a1 and a2, both engagements of the clutches a1 and a2 are released so that the drive wheel torque inputted from the input axle of the transmission can wholly be regenerated by means of the motor/generator b.

First Embodiment

Figure 2:
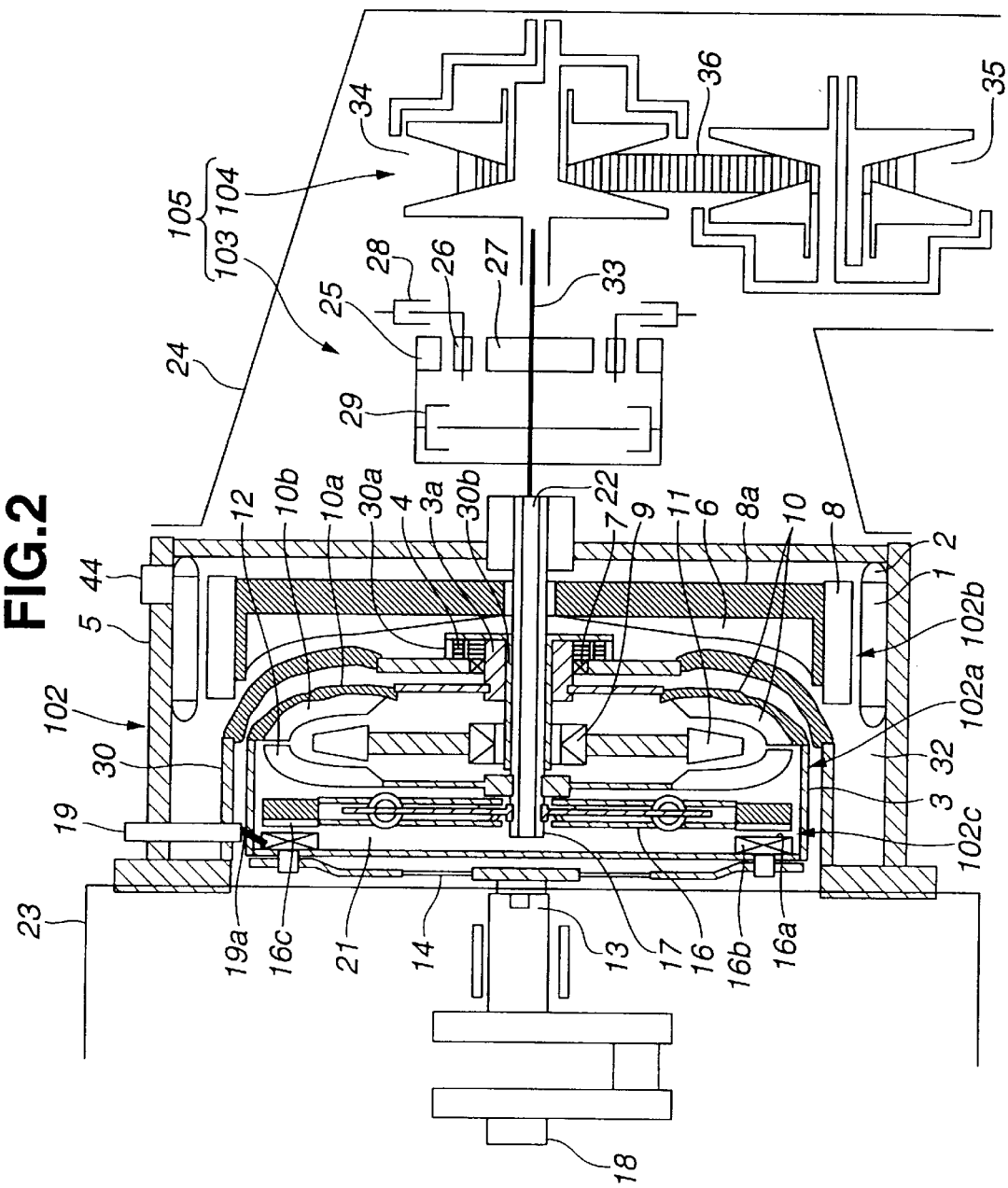
FIG. 2 is a cross sectional view of a serration coupling portion in the first preferred embodiment of the motor/generator unit according to the present invention.

FIG. 2 shows a cross sectional view of the motor/generator unit 102 in a first preferred embodiment according to the present invention.

The motor/generator unit 102 is interposed between the output axle 13 of the engine 23 and the input axle 105a of the transmission 105. The engine 23 is driven, for example, with a gasoline (so-called, gasoline engine). A revolving force (torque) outputted from the crankshaft 18 of the engine 23 is outputted to the motor/generator unit 102 fixed as a side surface of the engine 23 via the engine output shaft 13. In addition, the transmission 105 is constituted by a continuously variable transmission. The (forward-rearward) transmission 105 is constituted by the forward-rearward switching section 103 including a planetary gear and a belt-pulley type transmission mechanism section 104.

The motor/generator unit 102 is divided into two mutually independent chambers by means of an outer housing 5 (which corresponds to the housing c shown in FIG. 1) and an inner housing 30.

One of the two chambers is a motor chamber 32 which is defined by the outer housing 5 and the inner housing 30. The motor/generator 102b which functions as the electric motor and generator (it is noted that, in each flowchart, the motor/generator 102b is denoted by STR/ALT) is disposed within the motor chamber 32. The torque converter 102a is disposed within the inner housing 30. A lock-up purpose electromagnetic/hydraulic clutch 102c is disposed in the torque converter 102a.

The lock-up purpose electromagnetic/hydraulic clutch 102c is constructed so as to carry out engagement and release operation in response to a power supply to a coil portion 16b and a power supply turn off thereto together with the engagement and release operations of a lock-up piston 16 in response to the hydraulic supply thereto and a hydraulic drainage.

It is noted that the operation of the electromagnetic/hydraulic clutch 102c by means of the hydraulic is executed by the same program as that on a lock-up condition as a conventional lock-up torque converter.

A torque converter cover 3 is linked to an oil pump drive axle 3 a. A revolution of the converter cover 3 causes its revolving force to be inputted to the oil pump drive axle 3a so that a built-in oil pump 4 is driven to develop the hydraulic (oil pressure).

A space defined by the converter cover 3 and the inner housing 30 provides a dry chamber not to disturb the revolution of the converter cover 3. An oil seal 7 is disposed between an oil pump casing 30a and an oil pump drive axle 3a.

The inner housing 30 is fixedly supported on the engine 23. The oil pump casing 30a and a stator stationary axle 30b constitute the inner housing 30. The stator stationary axle 30b takes a hollow axis structure. A drive axle 17 is penetrated through the hollow axis structure and supported by the stator stationary axle 30b.

In addition, the oil pump drive axle 3a is rotatably supported on the stator stationary axle 30b. A stator blade 11 is fixedly supported via a one-way clutch 9. The stator blade 11 is not revolved in the same direction as the converter cover 3. However, when a torque due to the hydraulic is developed in the opposite direction to the converter cover 3, the stator blade 11 is supported on the one-way clutch 9 to be enabled to be revolved in the opposite direction.

The drive axle 17 penetrated and supported on the stator stationary axle 30b is connected to a turbine runner 12 and the lock-up piston 16. The lock-up piston 16 is in a serration coupling to be enabled to be slid on the drive axle 17.

Figure 3:
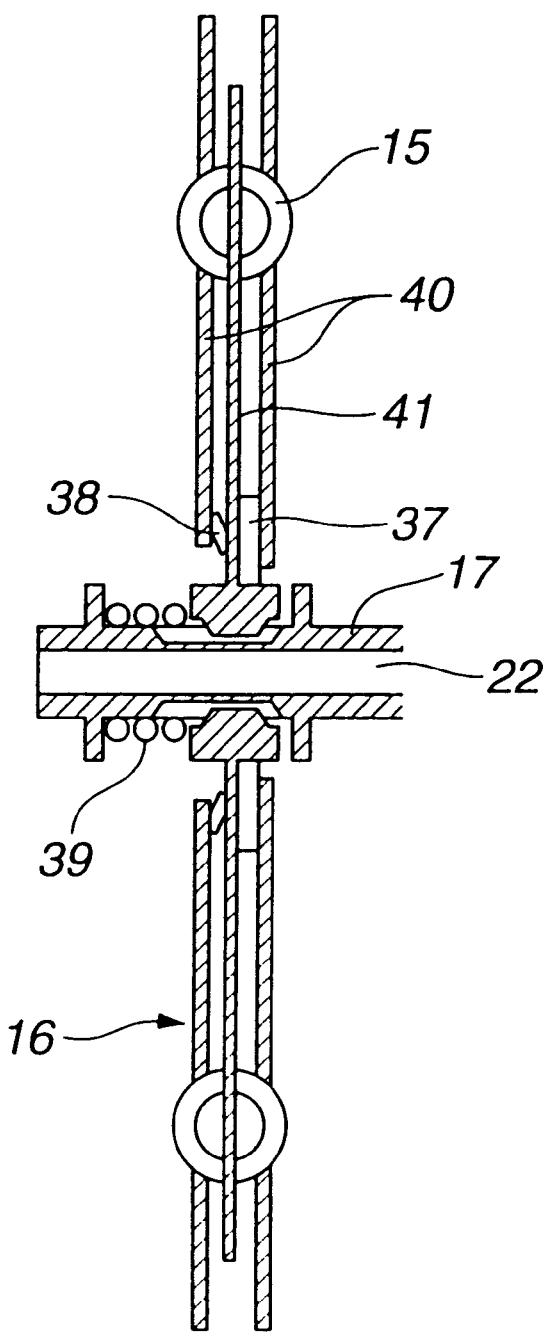
FIG. 3 is an expanded cross sectional view of a serration coupling portion in the first preferred embodiment of the motor/generator unit according to the present invention.

FIG. 3 shows an expanded cross sectional view of the serration coupling of the lock-up piston 16.

The lock-up piston 16 includes input plates 40 and an output plate 41. These two plates 40 and 41 are coupled together via a torsion spring 15. The two plates 40 and 41 are relatively and mutually pivoted to attenuate (absorb) a torsional vibration developed on the drive axle 17 and so forth.

A dish spring 38 and a frictional plate 37 are disposed between the input plates 40 and the output plate 41 to provide a hysteresis characteristic for the input torque during the relative pivotal movements of the two plates 40 and 41.

The serration coupling section limits expansion and contraction characteristics of the torsion spring 15 to which the two plates 40 and 41 are linked so that an abrupt torque variation can accurately be absorbed. The output plate 41 is in the serration coupling to the drive axle 17. The output plate 41 is held under a lock-up release state by means of a spring 39. An oil passage 22 is disposed within the drive axle 17. The oil passage 22 serves to adjust the oil pressure in an oil pressure chamber shown in FIG. 2. This oil pressure causes the electromagnetic/hydraulic clutch 102c to generate a clutching force as a hydraulic lock-up clutch.

Referring back to FIG. 2, the drive axle 17 penetrates through the stator stationary axle 30a of the inner housing 30 and through the motor chamber 32. The motor chamber 32 provides a dry chamber not to disturb the revolution of the rotor 8.

A rotor supporting member 8a is linked to a part of the drive axle 17 in the motor chamber 32. The drive of the drive axle 17 causes the rotor 8 of the motor/generator 102b installed on the rotor supporting member 8a to be revolved. In addition, the stator 1 of the motor/generator 102b is fixed on the outer housing 5. A fin 6 is attached onto the rotor supporting member 8a so that the revolution of the rotor supporting member 8a causes the rotor 8 and the stator 1 to be air cooled. The rotor supporting member 8a can secure a radial length of the rotor 8 and can position the rotor 8 at a radial outside of the torque converter 102a.

Hence, an axial length of the rotor 8 can be secured without a long extension of the axial length of the whole motor/generator unit 102. In addition, a capability of the motor/generator 102b as the motor and as the generator can highly be set.

A power supply section 44 is installed on an outside of the outer housing 5 to supply or receive the power to or from the motor/generator 102b. The stator 1 and the coil 2 are fixed along an inner peripheral surface of the outer housing 5. Although a specific reference numeral is described in FIG. 2, a jacket to perform a heat pipe cooling in a passage of which water or cooling medium is passed is installed on a fixed contact surface between the outer housing 5 and the stator 1.

The drive axle 17 penetrates through the outer housing 5 and is integrally linked to the input axle 105a of the transmission 105.

The forward-rearward switching mechanism 103 is constituted by the planetary gear. The forward-rearward switching section 103 includes a ring gear 25, a clutch 29 disposed within the ring gear 25, a pinion gear 26, a clutch 28 to fix the pinion gear 26, and the sun gear 27 linked to the rotary axle 33. The driving force transmitted from the drive axle 17 is transmitted from the drive axle 17 and is transmitted to the ring gear 28.

A connection pattern of the clutches 28 and 29 causes a rearward movement state, the neutral state, and a forward movement state to be determined. The driving force is transmitted to a gear ratio (a speed ratio in the case of the CVT) varying mechanism 104 via a rotary axle 33.

In the first embodiment, the gear ratio varying mechanism 104 is constituted by the continuously variable transmission. The drive force transmitted to the primary pulley 34 is transmitted to the secondary pulley 35 via the belt 36 and is transmitted to the drive axle via an idler gear, a final gear, and a differential gear (not shown) so that the drive road wheels of the vehicle are driven.

Figure 4:
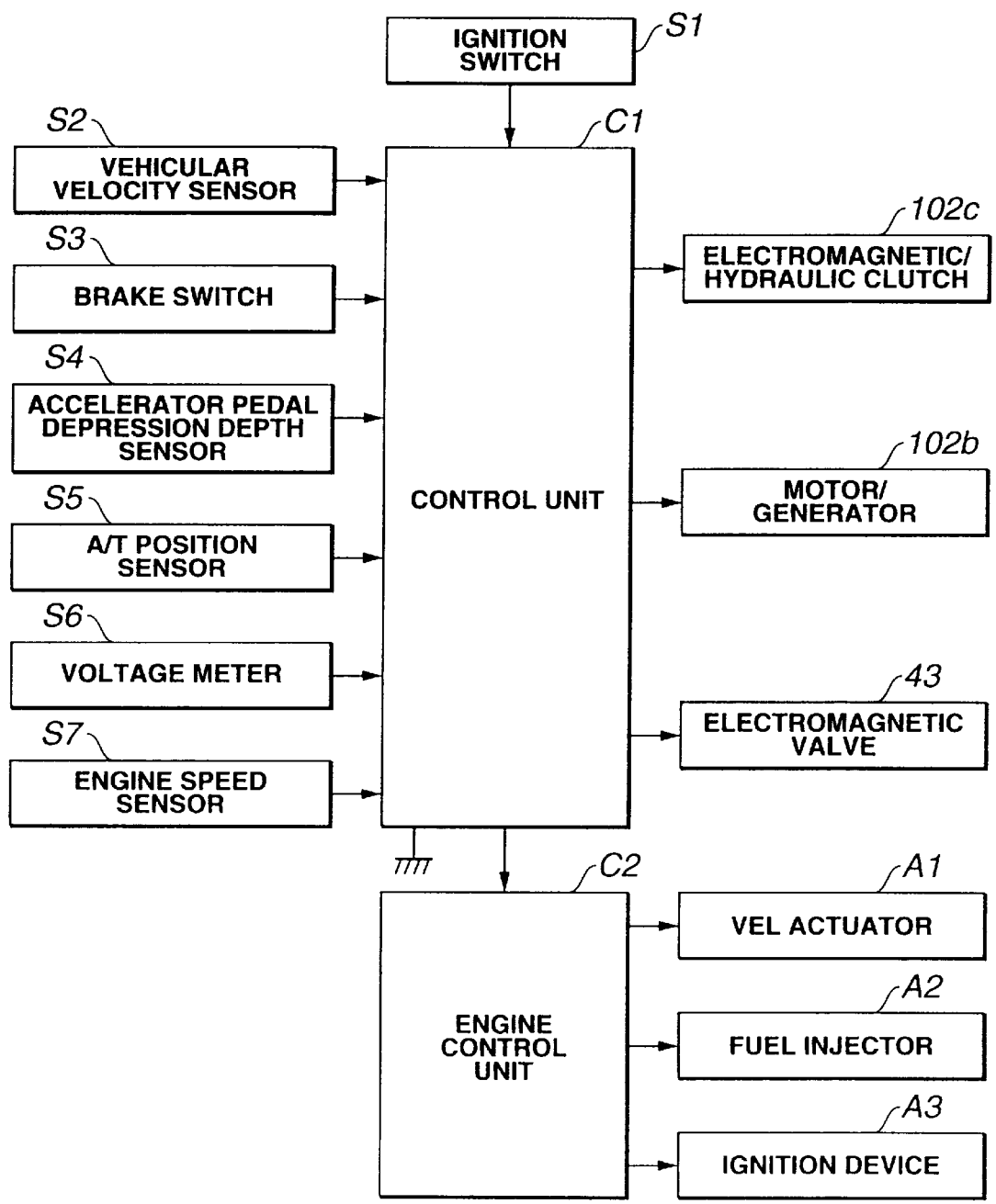
FIG. 4 is a circuit block diagram of the control unit and its peripheral circuits in the first embodiment shown in FIGS. 2 and 3.

FIG. 4 shows a control unit C1 and its peripheral circuits in the first preferred embodiment according to the present invention.

The control unit C1 is connected to an ignition switch 31. The control unit C1 receives each sensor output signal from a vehicular velocity sensor S2, a brake sensor 33, an acceleration sensor S4, an A/T position sensor S5, a voltage meter S6, and engine speed sensor S7, performs various arithmetic/logic operations based on the sensor output signals, and outputs control signals to an electromagnetic clutch 102c, the motor/generator 102b, an electromagnetic valve 43 (refer to FIG. 22), and an engine control unit C2. The engine control unit C2 serves to control drive of the engine 23. In the first embodiment, the engine control unit C2 outputs control signals to a variable valve timing mechanism A1 (it is noted that the variable valve timing mechanism includes an electromagnetically-powered valve operating apparatus as will be described later), a fuel injection unit A2, and ignition unit A3 on the basis of a command signal (one of the control signals) from the control unit C1.

It is noted that each of the control units C1 and C2 is constituted by a microcomputer having a CPU (Central Processing Unit), a ROM (Read Only Memory), a RAM (Random Access Memory), an I/O Port, and a common bus.

Next, contents of control by means of the control unit C1 in the first embodiment will be described with reference to the respective flowcharts.

Figure 5:
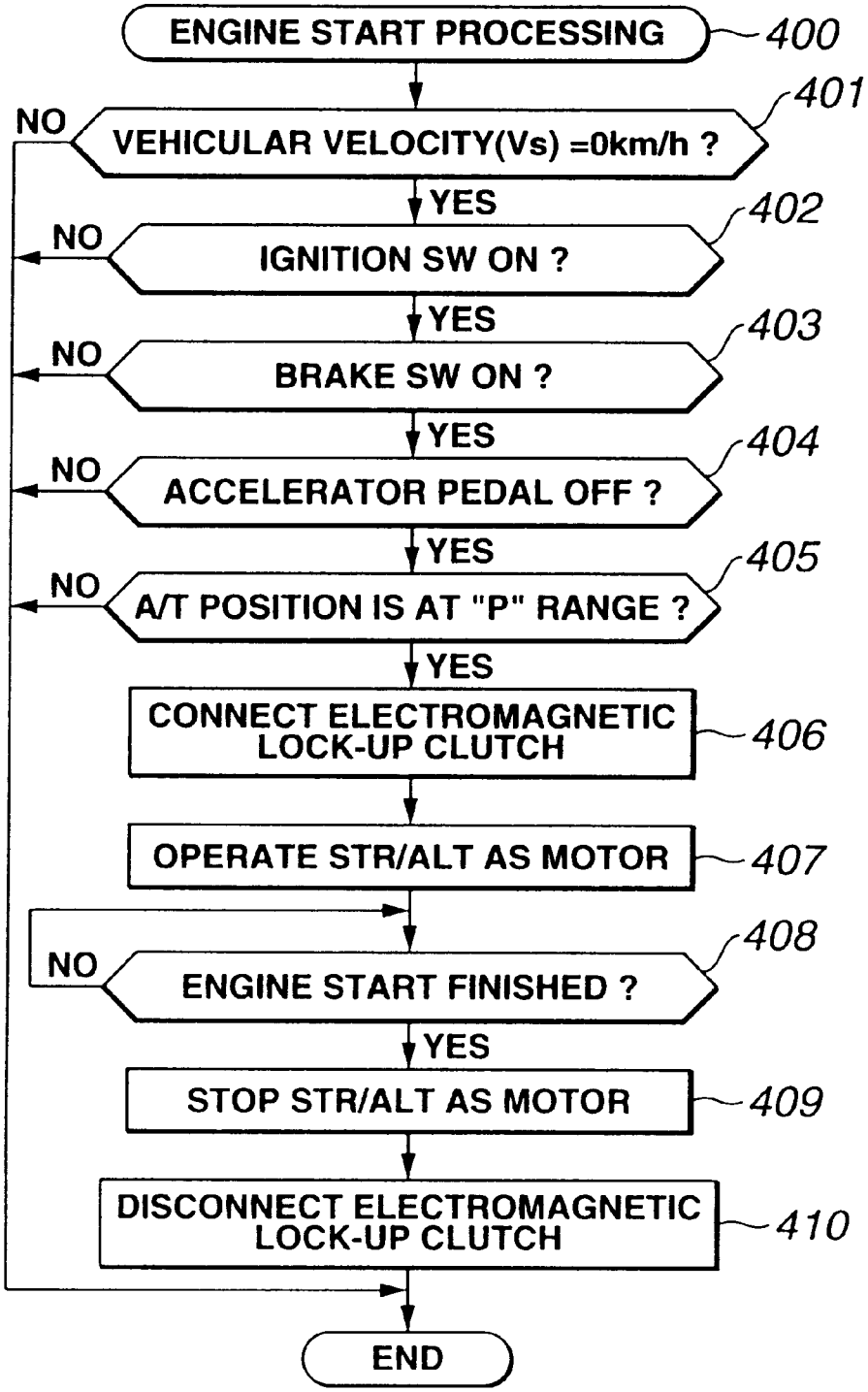
FIG. 5 is an operational flowchart for explaining an engine start processing executed in the first embodiment.

FIG. 5 shows an operational flowchart of an engine start processing 400 from a vehicular stop state executed in the first preferred embodiment.

At a step 401, the control unit C1 viz. the CPU of the control unit C1 determines if the vehicular velocity V is zero (0 Km/h).

If No at the step 401, the present routine is ended. If Yes at the step 401, the routine goes to a step 402.

At the step 402, the control unit C1 determines whether the ignition switch S1 is turned to ON. If the ignition switch S1 is turned to ON (Yes) at the step 402, the routine goes to a step 403. If NO at the step 402, the routine is ended. At the step 403, the control unit C1 determines whether the brake sensor output signal indicates ON state, viz., the vehicular brake is manually applied. It is noted that the brake sensor is the brake switch S3.

If Yes at the step 403, the routine goes to a step 404. If No at the step 403, the present routine is ended.

At the step 404, the control unit C1 determines whether an accelerator pedal is turned off, viz., the vehicular driver has released from the accelerator pedal (an accelerator manipulation gives zero).

If No at the step 404, the present routine is ended. If Yes at the step 404, the routine goes to a step 405. At the step 405, the control unit C1 determines whether an A/T selector range is in a "P" range (parking range). If No at the step 405, the routine is ended.

If Yes at the step 405, the routine goes to a step 406.

At the step 406, the control unit C1 outputs the control signal to clutch the electromagnetic clutch portion of the electromagnetic/hydraulic clutch 102c. Then, the routine goes to a step 407.

At the step 407, the control unit C1 outputs the control signal to function the motor/generator 102b as the electric motor.

At the step 408, the control unit C1 confirms whether the engine start has been completed. If confirmed (Yes) at the step 408, the routine goes to a step 409. At the step 409, the control unit C1 stops the operation of the motor/generator as the motor. At the step 410, the control unit outputs the control signal to release the clutched state of the electromagnetic clutch portion from the electromagnetic/hydraulic clutch 102c.

Figure 15:
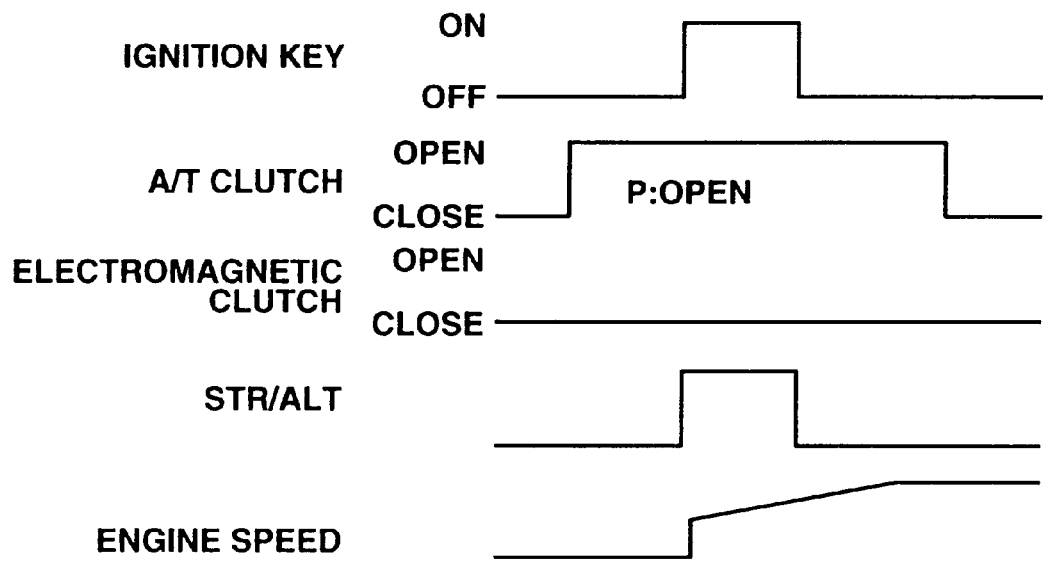
FIG. 15 is an integrally timing chart for explaining the engine start in the first embodiment.

That is to say, in the engine start control process, it is confirmed that the vehicular velocity (Vs) is 0 km/h, the ignition switch S1 is in the ON state, the brake is applied (S3 is in the on state), the accelerator is in the off state, and the A/T selector range is in the "P" range. Then, as shown in a integral timing chart of FIG. 15, the control unit C1 controls the operations of the torque converter 102a and the motor/generator 102b in such a manner that the torque converter 102a is in a lock-up state and the motor/generator 102b as the motor. After the confirmation of the engine start completion, the motor/generator 102b is stopped and the engagement of the electromagnetic/hydraulic clutch 102c is released.

The operation after the engine start will be described below.

When the engine 23 is in the idling state, the drive force outputted from the output axle 13 of the engine 23 is transmitted via a flexible plate 14 (refer to FIG. 2) installed on the converter cover 3 of the torque converter 102a in the motor/generator unit 102 to suppress a bending vibration on the engine crankshaft. Thus, the torque converter cover 3 is driven to be revolved. An oil pump drive axle 3a is linked to the converter cover 3. Hence, the oil pump 4 generates the hydraulic (oil pressure).

At the same time, a pump impeller 10 fixed on the inner side of the converter cover 3 is driven to agitate oil in the converter cover 3.

This oil collides against the stator blade 11 so that the direction at which the oil is caused to flow is modified. The modified oil flow has a torque augmentation action due to a summing of the engine torque and a reaction force of the stator blade 11. The augmented torque is transmitted to the drive axle 17 as the drive force via the turbine runner 12.

The rotor 8 and the rotor supporting member 8a which are motor functioning parts as the starter during the engine start are driven through the revolution of the drive axle 17.

However, the drive force from the engine can have these rotor 8 and rotor supporting member 8a function as the generator.

In addition, the drive force of the drive axle 17 causes the ring gear 25 of the forward-rearward switching mechanism 103 to be driven. At this time, when the clutches 28 and 29 are released, the drive force is not transmitted to the transmission 104.

Figure 6:
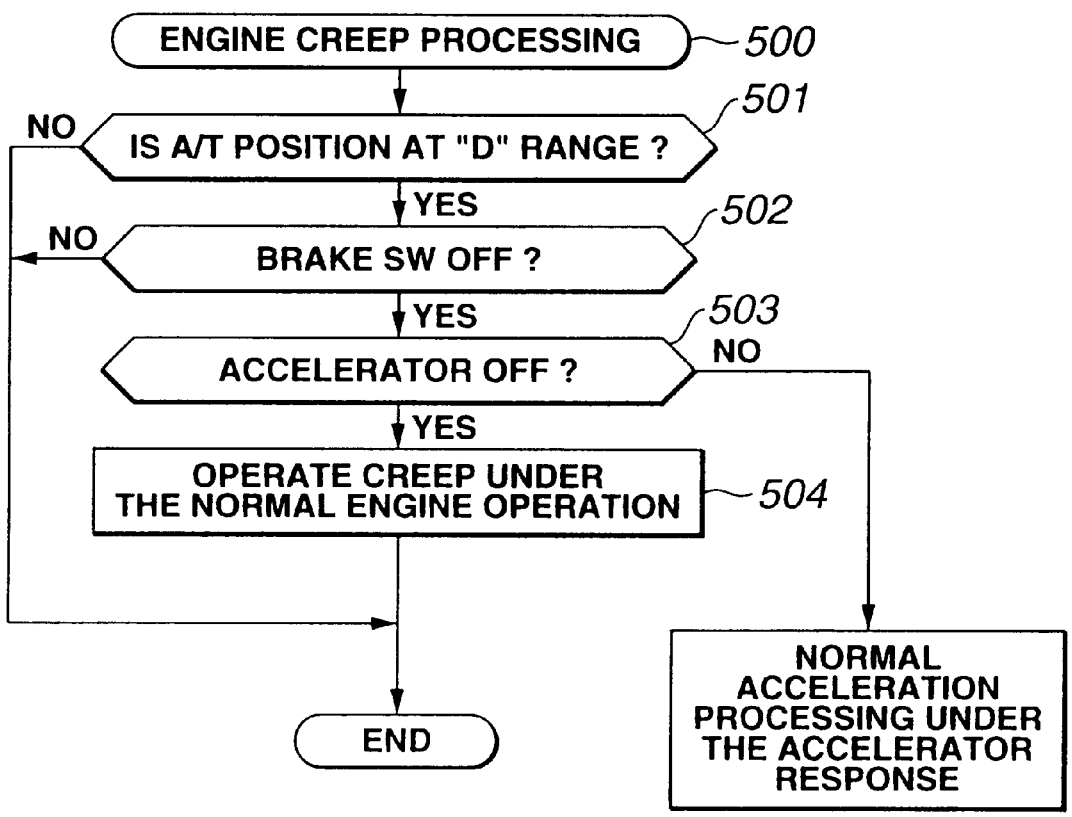
FIG. 6 is an operational flowchart for explaining an engine creep processing executed in the first embodiment.

FIG. 6 shows a flowchart for explaining an engine creep processing 500.

At a step 501, the control unit C1 determines whether the A/T selector range is placed at a "D" range (Drive range).

If Yes at the step 501 (in the "D" range), the routine goes to a step 502. If No at the step 501, the present routine is ended.

At the step 502, the control unit C1 determines whether the brake is in the off state. If Yes at the step 502, the routine goes to a step 503. If No at the step 502, the routine is ended.

At the step 503, the control unit C1 determines whether the accelerator is in the off state. If yes at the step 503, the routine goes to a step 504.

If No at the step 503, the routine calls a normal accelerator responded acceleration processing as shown in FIG. 6.

The step 504 indicates a normal engine creep process.

The engine creep means that the engine 23 is driven so that a creep force caused by the torque converter 102a with the engine 23 driven is developed to slightly output the drive force. If is noted that at the "D" range the clutch is engaged.

If the vehicle is forwarded, the vehicular driver depresses the brake to place the range select lever of the transmission in the "D" range. At this time, the clutch 29 of the forward-rearward switching mechanism 103 is coupled. Since the vehicular driver depresses the brake, the drive axle 17 is fixed. The drive force transmitted from the engine output axle 13 is stored as the creep force within the torque converter 3. Hence, as the vehicular driver releases the brake, the vehicle is propelled slightly due to the creep force.

Figure 7:
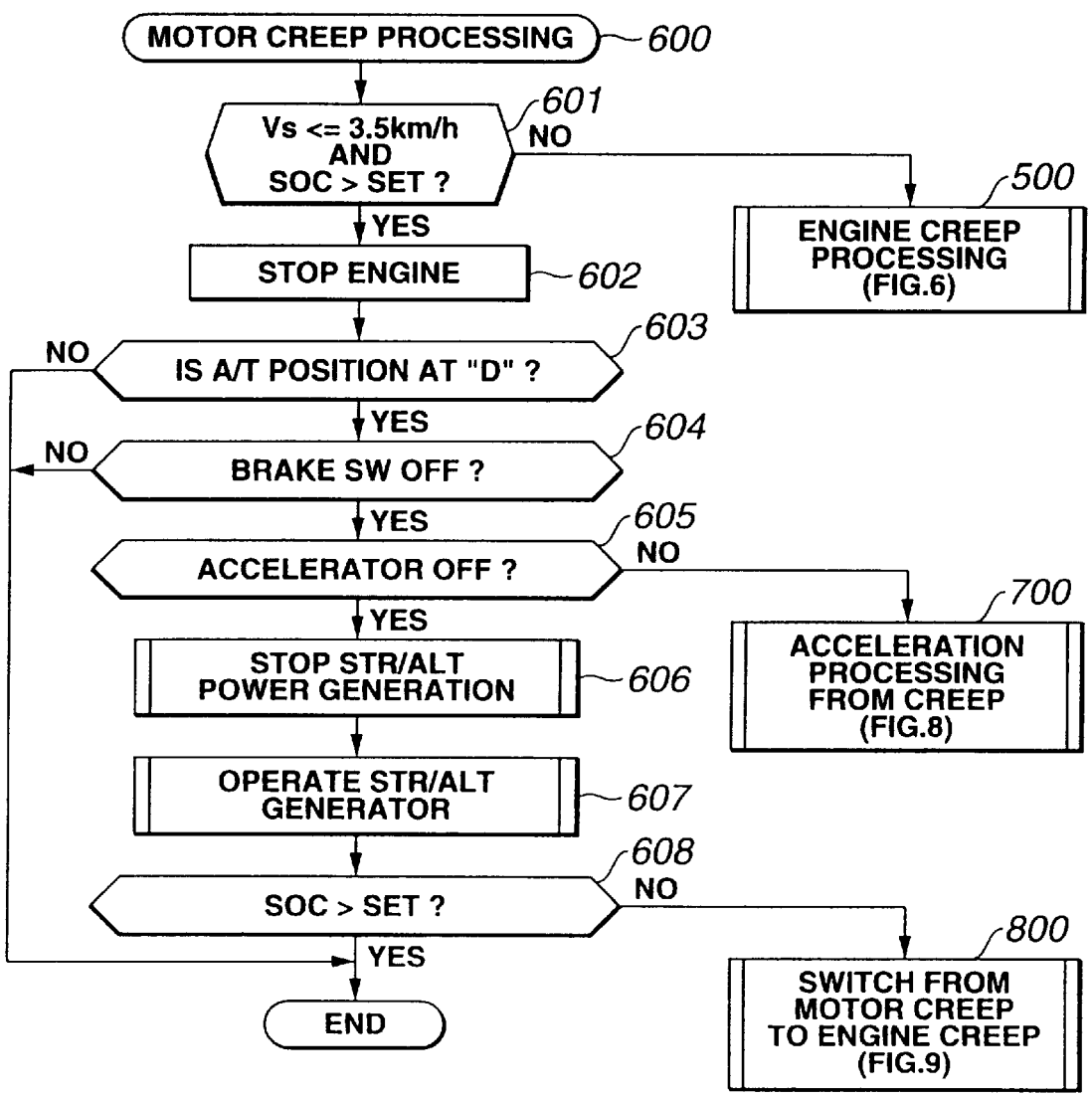
FIG. 7 is an operational flowchart for explaining a motor creep processing executed in the first embodiment.

FIG. 7 shows an operational flowchart of a motor creep process 600 executed using the motor/generator 102b.

At a step 601, the control unit C1 determines whether the vehicular velocity Vs is below 3.5 Km/h or less and a variable representing a charged state of the battery voltage, for example, a battery output voltage (hereinafter, denoted by SOC) is larger than a set value SOC>SET.

If Yes at the step 601, the routine goes to a step 602.

If No at the step 601, the routine goes to a step 500 to carry out the engine creep process.

At a step 602, the engine 23 is stopped.

At the next step 603, the control unit C1 determines whether the A/T position (selector range) is in the "D" range. If Yes at the step 603, the routine goes to a step 604. If No at the step 603, the present routine is ended.

At the step 604, the control unit C1 determines whether the brake is in the off state. At the step 605, the control unit C1 determines if the accelerator is in the off state. If Yes at the step 605, the routine goes to a step 606. If No at the step 605, the routine goes to a step 700 to carry out the acceleration processing from the motor creep.

The motor creep processing is such that the generation by means of the motor/generator 102b is stopped to cause the motor/generator 102b to function as the motor to make the creep through the motor if the SOC is equal to or above the set value, the A/T position is in the "D" range, the brake is in the off state, and the accelerator pedal is in the off state. It is noted that when the SOC falls equal to or below the set value in a midway through the motor creep execution, the switching to the engine creep process is made.

It is noted that a point (a) of FIG. 16 shows an integral timing chart when an engine idling stop of the engine is transferred to the motor creep.

Figure 8:
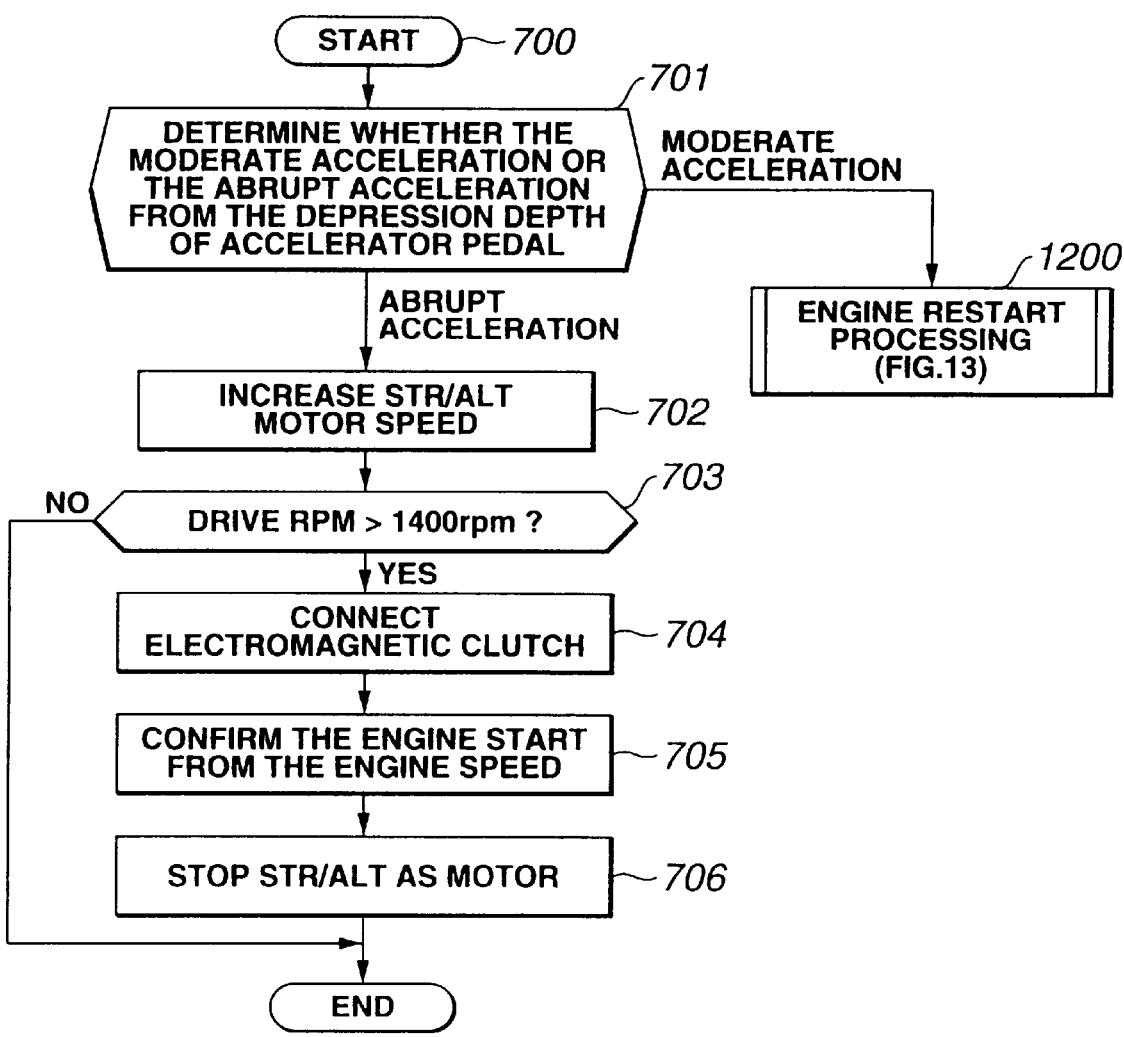
FIG. 8 is an operational flowchart for explaining an acceleration processing transferred from the motor creep processing shown in FIG. 7.

FIG. 8 shows a flowchart of an acceleration processing 700 form the motor creep.

At a step 701, the control unit C1 determines whether the vehicle running state is in a moderate acceleration state or in an abrupt acceleration state. If the control unit C1 determines that the vehicle is in a moderate acceleration state, the routine goes to a step 1200 in which an engine restart processing is carried out. The step 1200 indicates a subroutine shown in FIG. 13 as will be described later.

If abrupt acceleration is resulted at the step 701, the routine goes to a step 702.

At the step 702, the control unit C1 raises the number of revolutions per minutes of the motor/generator 102b as the motor.

At the step 703, the control unit C1 determines whether the drive number of revolutions per minutes of the motor/generator 102b as the motor is greater than 1400 rpm.

If Yes (DRIVE RPM>1400 rpm) at the step 703, the routine goes to a step 704. If No (DRIVE RPM>1400 rpm) at the step 703, the routine goes toastep 704. If No (DRIVE RPM≦1400 rpm) at the step 703, the routine is ended.

At the step 704, the control unit C1 outputs the control signal to clutch both hydraulic and electromagnetic portions of the electromagnetic/hydraulic clutch 102c.

At a step 705, the control unit C1 confirms the engine start according to the engine speed (rpm).

At a step 706, the control unit C1 stops the operation of the motor on the motor/generator 102b.

That is to say, during the acceleration from the creep, the control unit C1 determines whether the moderate acceleration or the abrupt acceleration occurs from the opening degree of the accelerator.

If determining the abrupt acceleration, the control unit C1 raises the drive numbers of revolutions per minutes of the motor/generator 102b as the motor.

Furthermore, if DRIVE RPM>1400, the electromagnetic/hydraulic clutch 102c is engaged to start the engine.

After the engine start is confirmed from the engine rpm, the control unit C1 stops the motor/generator 102b as the motor. During the abrupt acceleration request, the engine 23 is not started but the rpm of the motor/generator 102b is raised. Consequently, the response characteristic is secured.

During the abrupt acceleration request, the torque converter 102a is locked up. The engagement of both hydraulic and electromagnetic parts of the electromagnetic/hydraulic clutch 102c secure the responding characteristic and clutching force.

Figure 9:
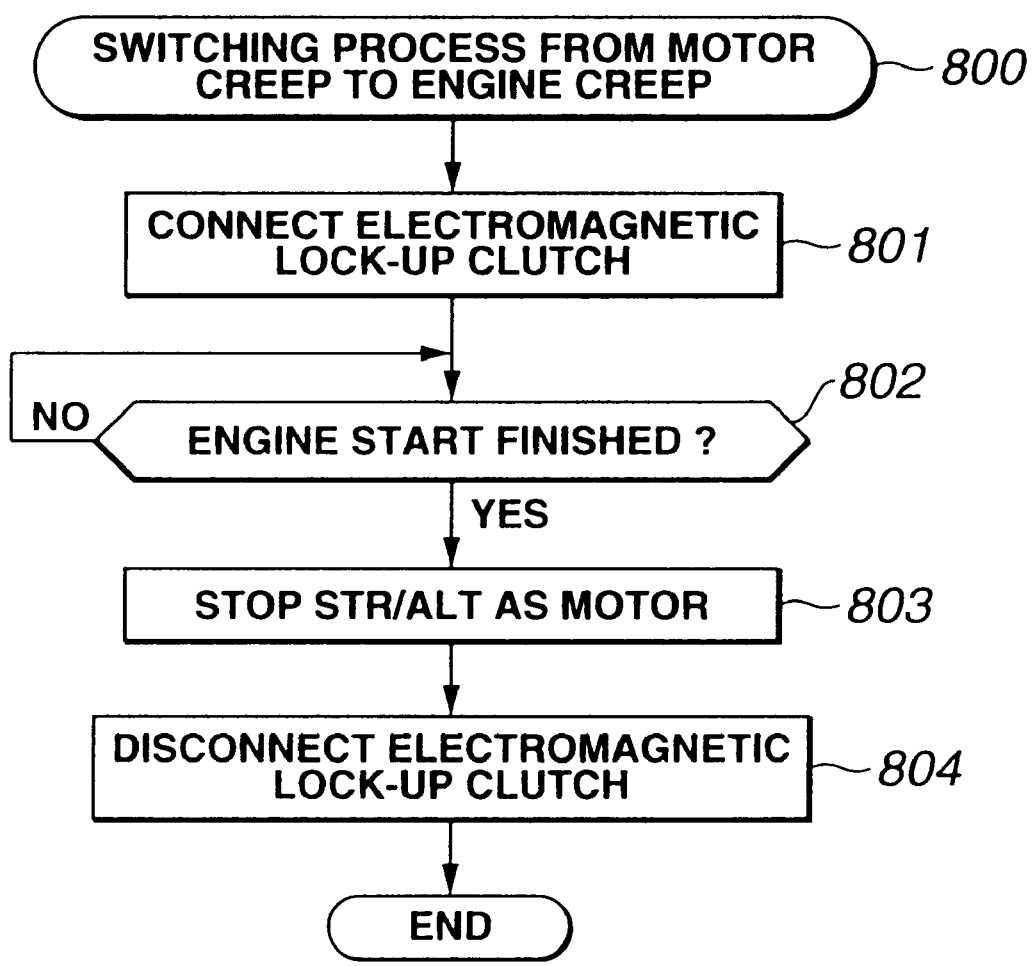
FIG. 9 is an operational flowchart for explaining a switching process from the motor creep to the engine creep in the first embodiment.

FIG. 9 shows a flowchart of a switching processing 800 from the motor creep to the engine creep.

At a step 802, the control unit C1 confirms whether the engine start has been completed. Until the completion of the engine start, this step is repeated.

At a step 803, the control unit C1 outputs the control signal to stop the motor/generator 102b as the motor.

At the next step 804, the control unit C1 outputs the clutching of the electromagnetic clutch 102c.

During the operation of the motor creep, the motor/generator 102b functions as the motor with the electromagnetic/hydraulic clutch 102c open. First, the electromagnetic hydraulic clutch 102c is engaged. Thus, the drive force of the motor is inputted to the engine 23 to start the engine. After the confirmation of the engine start, the control unit C1 stops the motor/generator 102b functioning as the motor to disconnect electrically from the electromagnetic/hydraulic clutch 102c.

Figure 19:
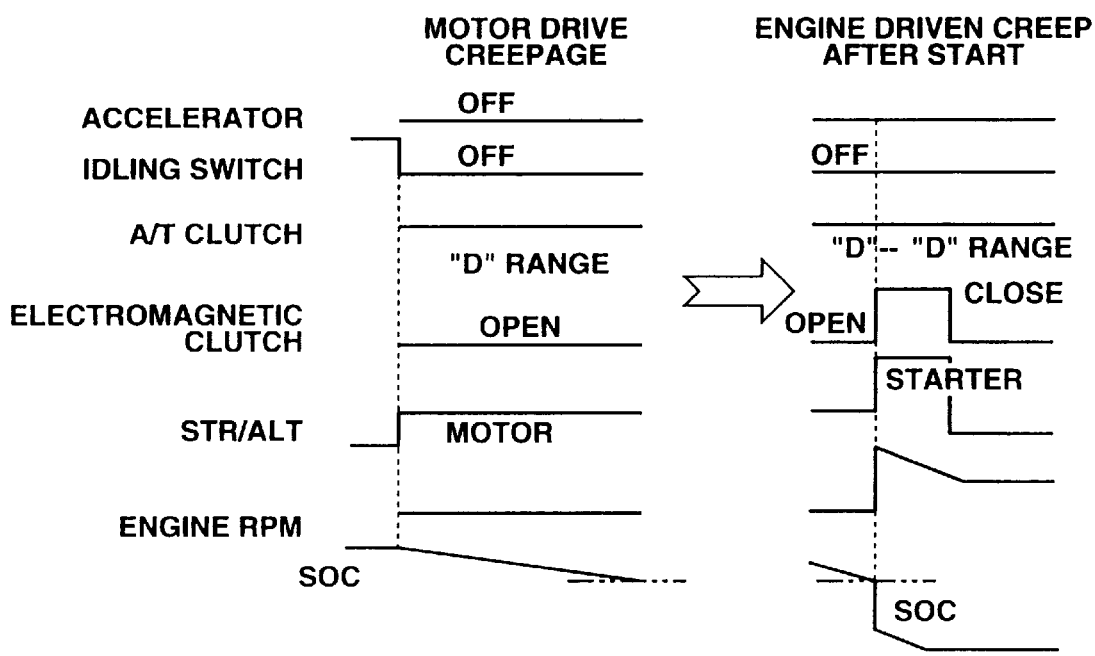
FIG. 19 is an integrally timing chart for explaining a switching process from the motor creep to the engine creep in the case of the first preferred embodiment.

FIG. 19 shows an integral timing chart. Thus, a smooth switching process is carried out.

Figure 10:
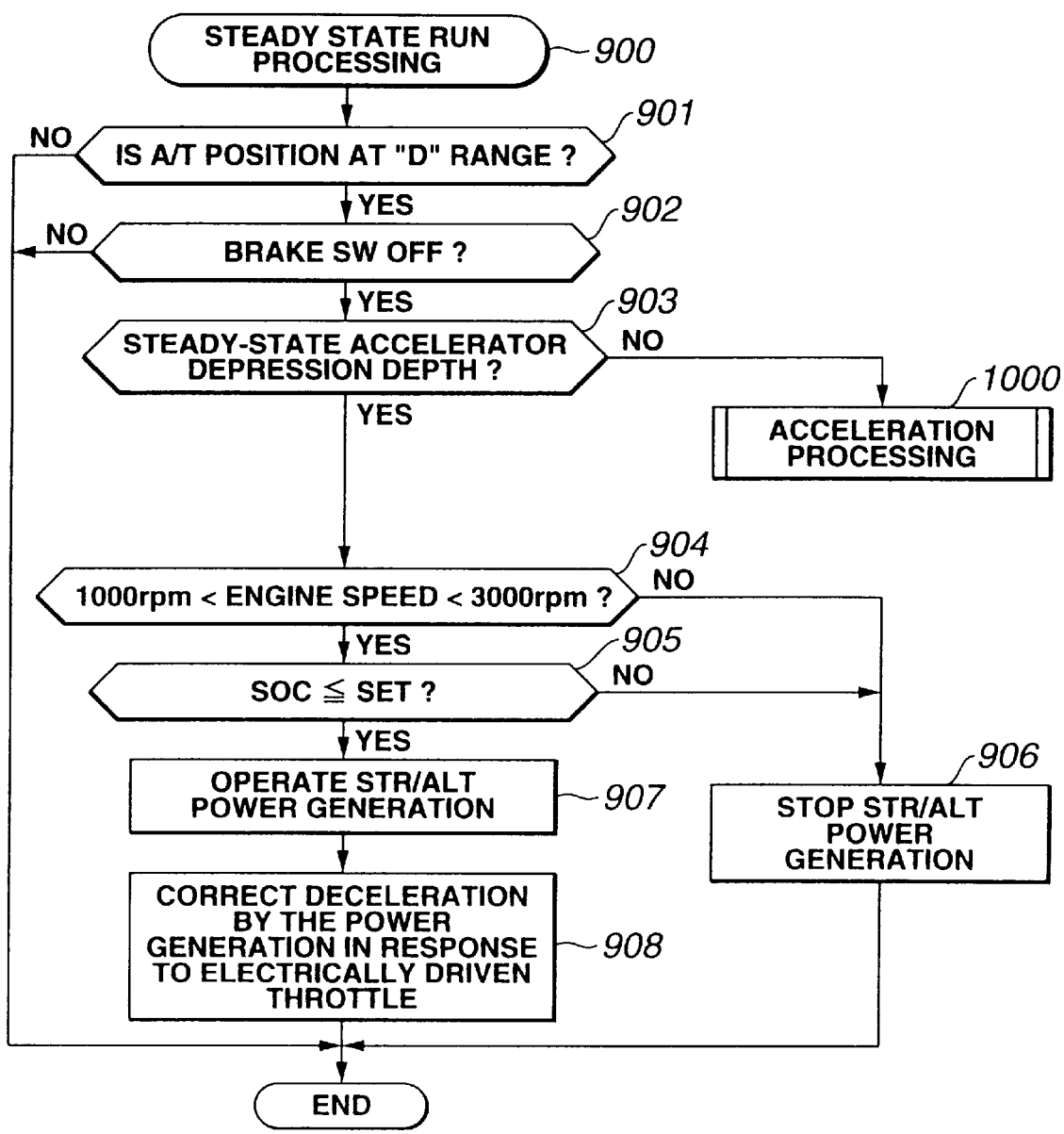
FIG. 10 is an operational flowchart for explaining a steady state running processing in the first preferred embodiment according to the present invention.

FIG. 10 shows an operational flowchart of a steady state running process.

At a step 901, the control unit C1 determines whether the A/T position (selector range) falls in the "D" range.

If Yes at the step 901, the routine goes to a step 901. If No at the step 902, the routine is ended.

At a step 902, the control unit C1 determines whether the brake is in the off state. If Yes at the step 903, the control unit C1 determines that the acceleration is in a steady state (,i.e., the accelerator pedal is depressed to some degree without change).

If it is the steady state acceleration, the routine goes to a step 904. If No at the step 903, the control unit determines that the accelerator pedal is depressed deeply and the vehicle is accelerated and the routine goes to a step 1000. At the step 1000, the acceleration processing is started.

At the step 904, the control unit C1 determines whether the engine acceleration speed falls in a range from 1000 to 3000 rpm.

If Yes at the step 904, the routine goes to a step 905. If No at the step 904, the routine goes to a step 906.

If SOC≦SET at the step 905, the routine goes to a step 907.

If No (SOC>SET) at the step 905, the routine goes to the step 906.

At the step 906,the control unit C1 stops the generation of the motor/generator 102b.

At the step 907, the control unit C1 outputs the control signal to operate the generation of the motor/generator 102b.

Then, at the next step 908, the control unit C1 outputs the control signal to perform a deceleration correction corresponding to the generation through an electronic throttling.

That is to say, in a case where the control unit C1 determines that the acceleration opening angle is in the steady state so that the vehicle cruises, the control unit C1 causes the motor/generator 102b to operate as the alternator if the engine speed is in the range from 1000 to 3000 rpm and the value of SOC is within the set value.

A torque loss occurring due to this power generation as the alternator is compensated by the deceleration correction made through the control for the electro throttle valve so that the power generation without giving the disagreeable feeling to the vehicular driver is carried out.

Figure 17:
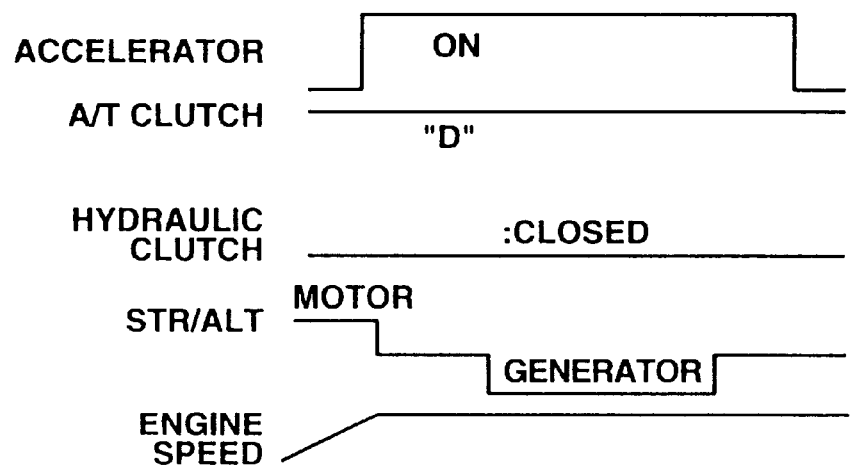
FIG. 17 is an integrally timing chart for explaining a steady state running process in the case of the first preferred embodiment.

FIG. 17 shows a timing chart with the steady state run processing.

Figure 11:
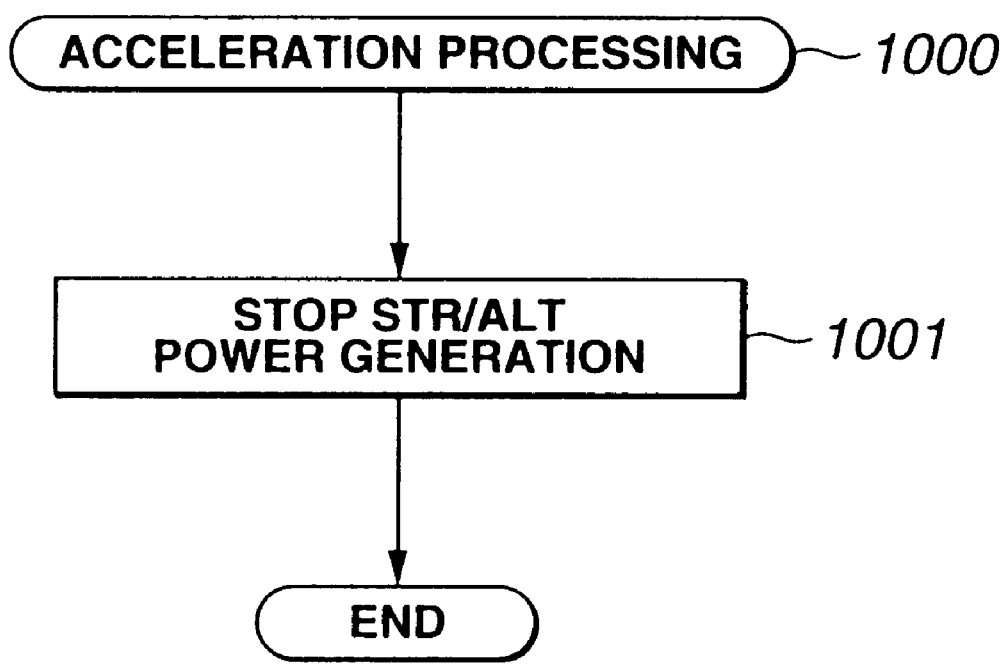
FIG. 11 is an operational flowchart for explaining an acceleration processing in the first preferred embodiment according to the present invention.

FIG. 11 shows a flowchart when the vehicle in which the motor/generator unit 102 is mounted is transferred from the steady state run (the vehicular cruise run) to the acceleration (the acceleration processing routine).

At a step 1001, the control unit C1 outputs the control signal to stop the generation by the motor/generator 102b.

In a case where during the steady state run the control unit C1 determines that the acceleration request occurs according to the accelerator opening. At this time, the power generation stops to be transferred to the normal acceleration operation by means of the engine. This can carry out the acceleration operation without loss of the driver's demand even if the engine output is small.

Figure 12:
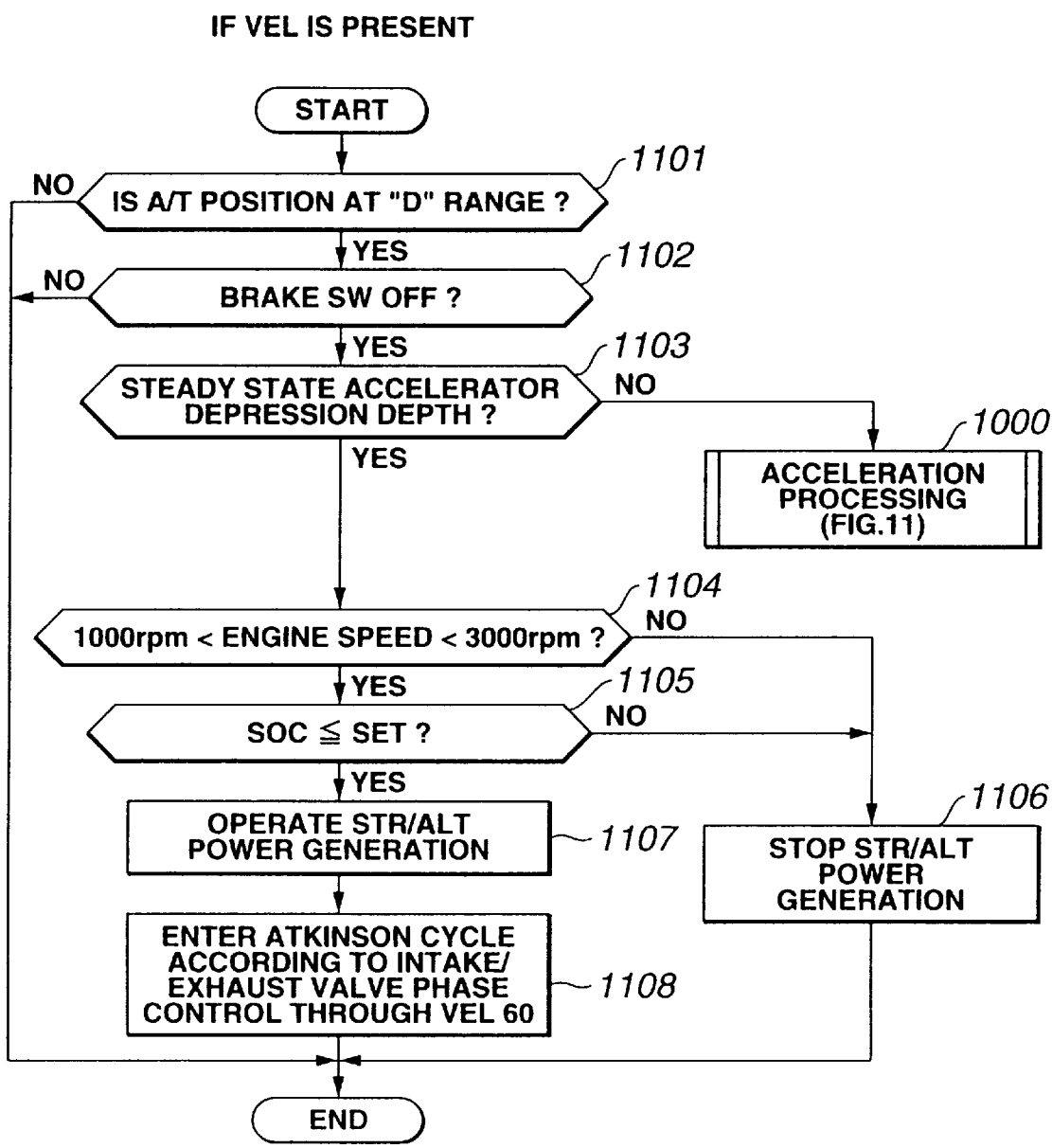
FIG. 12 is an operational flowchart representing the steady state running processing in a case where a variable valve operating mechanism (VEL) is adopted in an engine in the first embodiment according to the present invention.

FIG. 12 shows an operational flowchart representing the steady state running processing for the vehicle in which a variable valve operating mechanism (abbreviated as VEL and a European Patent Application Publication No. EP 0 967 368 A2 published on Dec. 29, 1999 describes the variable valve operating mechanism as an electromagnetically-powered valve operating apparatus for an internal combustion engine) 60 is equipped in the engine 23 shown in FIG. 1.

Figure 21:
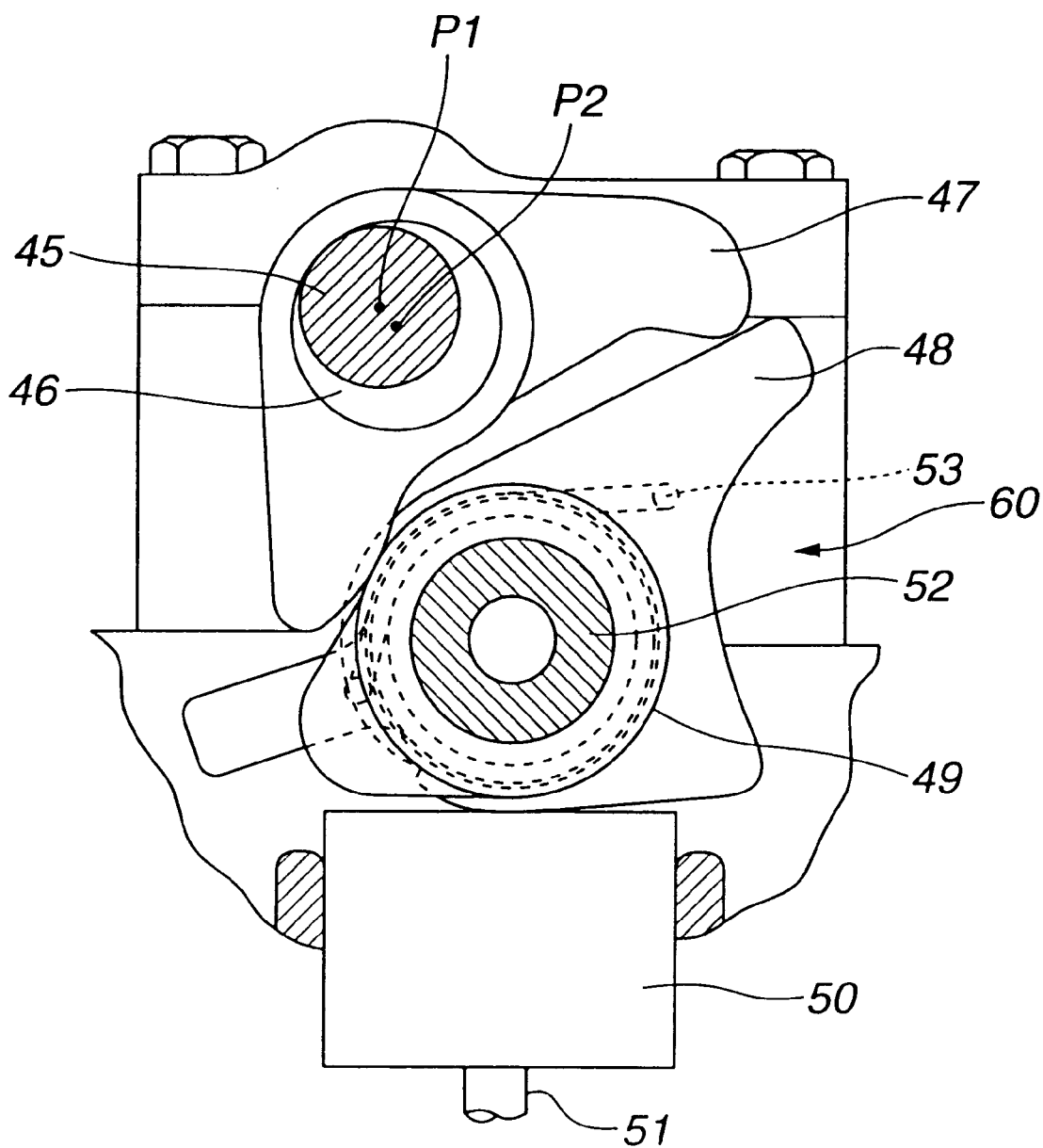
FIG. 21 is an expanded cross sectional view of the variable valve operating mechanism in the first preferred embodiment according to the present invention.

FIG. 21 shows a structure of the VEL 60.

In FIG. 21, an intake valve 51 (in FIG. 21, an upper end portion thereof is shown) is biased in a close direction by means of a biasing force inputted from a valve lift mechanism 50 through a spring (not shown). In FIG. 21, numeral 52 denotes a camshaft. When the camshaft 52 is revolved, a cam 49 integrally attached on the camshaft 52 is revolved in the camshaft revolution.

In addition, when the cam 49 is revolved, a left side end portion of a swing arm 47 as viewed from FIG. 21 is accordingly lifted and lowered so that a right side end of the swing arm 47 repeats a pendulum motion is lifted and lowered in the reversed sequence to the left side end thereof with its control axle 45 as a center. Accordingly, the upper end portion of the swing arm 48 is accordingly lifted and lowered.

Hence, as a swing cam 48 is displaced in a downward direction as viewed from FIG. 21, the valve lifter 50 is depressed downward to open the intake valve 51. It is noted that numeral 53 denotes a torsional spring to bias the swing arm 48 in a counterclockwise direction.

The control axle 45 is pivotally supported with a point P2 in FIG. 21 as an axial center. This pivotal motion of the control axle 45 is carried out by the VEL actuator (electromagnetic actuator) A1 shown in FIG. 4.

That is to say, the VEL actuator A1 causes the control axle 45 to be pivoted. When a wall thickness portion of the control axle 45 is moved, a press-down length of the swing arm 47 is modified so that a valve closure timing and valve lift variable are modified. Thus, an open-and-closure timing and a valve lift quantity are variably controlled to secure an improvement of fuel economy and a stable driveability during the engine low-speed-and-low-load condition and to secure a sufficient output due to an improvement in an intake air charging efficiency during an engine high-speed-and-high-load condition.

In the first embodiment, a combustion efficiency is improved by the VEL 60 to perform, so-called, an Atkinson cycle. The Atkinson cycle is disclosed in a U.S. Pat. No. 5,924,395.

Furthermore, in the first embodiment, the VEL actuator A1 is operated to actuate the intake valve 51 not to wholly open (to be completely closed or the intake valve 51 is continued to be in a full close state). If the intake valve 51 remains closed, the air in the cylinder of the engine 23 is tightly closed so that a loss in a movement energy involved in air in-flow or air out-flow with the in-cylinder air tightly closed becomes nullified.

FIG. 12 shows an operational flowchart for the steady state run processing.

At a step 1101, the control unit C1 determines whether the A/T position is at the D range. If No at the step 1101, the routine is ended. If Yes at the step 1101, the routine goes to the step 1102 in which the control unit C1 determines if the brake switch is in the off state.

At the step 1103, the control unit C1 determines whether the accelerator depression depth is such as in a level of the steady state running.

If Yes at the step 1103, the routine goes to the step 1000.

If 1000 rpm<ENGINE SPEED<3000 rpm at the step 1104, the routine goes to a step 1105.

If NO at the step 1104, the routine goes to a step 1106.

If Yes at the step 1104, the routine goes to a step 1105 in which the control unit C1 determines whether SOC≦SET.

If Yes at the step 1105, the routine goes to a step 1107. If No at the step 1105, the routine goes to the step 1106.

At the step 1106, the generation by the motor/generator 102*b* is stopped.

At the step 1107, the generation by the motor/generator 102*b* is operated.

At the step 1108, the intake-and-exhaust-valve phase control through the VEL is turned to the Atkinson cycle.

In the steady state run processing, a basic concept of control flow is the same as the control flow in FIG. 10. However, in the present control shown in FIG. 12, a regenerative power corresponding to the deceleration correction through the electronic control throttling is not carried out.

The VEL 60 causes the intake and exhaust valve phase to fall in the Atkinson cycle so that the improvement in the combustion efficiency is made and the improvement portion in the combustion efficiency can be transferred to the regeneration.

Figure 13:
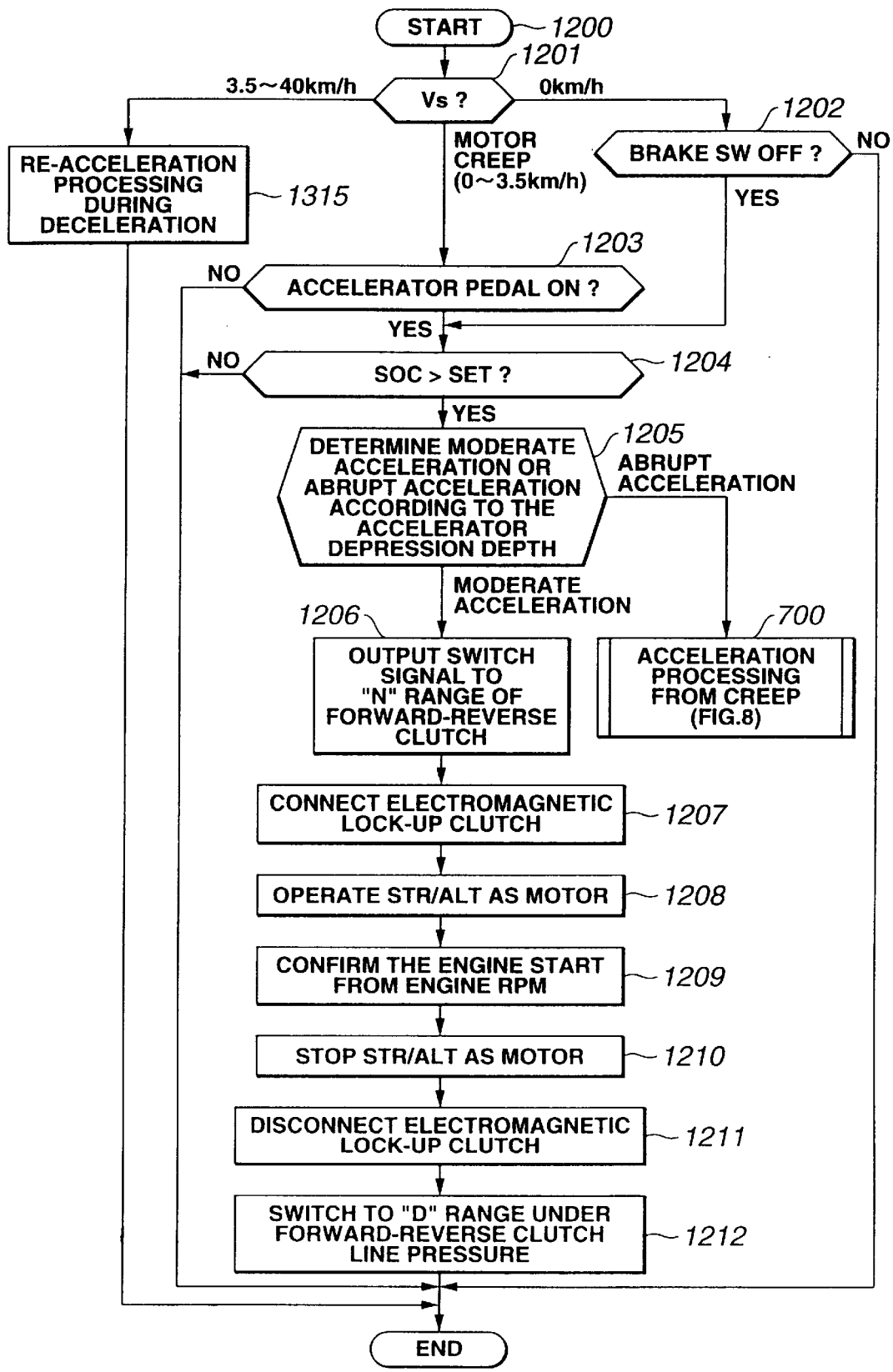
FIG. 13 is an operational flowchart for explaining a deceleration and re-acceleration processing in the case of the first preferred embodiment.

FIG. 13 shows an operational flowchart of the engine restart processing of 1200.

At a step 1201, the control unit cl determines the vehicular velocity Vs. If the vehicular velocity is 0 km/h, the routine goes to the step 1202. If 0 km/h <VEHICLE SPEED (Vs)<3.5 Km/h, the vehicle is in the motor creep state and the routine goes to a step 1203. If Vs=3.5 Km/h through 40 Km/h at the step 1201, the routine goes to a step 1315.

If 3.5 Km/h<VEHICLE SPEED (Vs)<40 Km/h at the step 1201, the routine goes to a step 1315 to perform the re-acceleration processing during the deceleration processing 1315.

At a step 1202, the control unit C1 determines whether the brake is in the off state. If Yes at the step 1202, the routine goes to a step 1204. If No at the step 1202, the present routine is ended. At the step 1204, the control unit C1 determines whether SOC is above the set value SET. If Yes (SOC>SET) at the step 1204, the routine goes to a step 1205. If No at the step 1204, the routine is ended.

At the step 1205, the control unit C1 determines whether the moderate acceleration or the abrupt acceleration occurs according to the opening angle of the accelerator.

If the moderate acceleration occurs, the routine goes to the step 1206. If the abrupt acceleration occurs, the routine goes to a step 700 to carry out the acceleration processing 700 from the motor creep processing switch.

At the step 1206, the control unit C1 outputs the signal to switch the forward-rearward switching mechanism 103 to the N range.

At the step 1207, the control unit C1 engages the electromagnetic clutch portion of the electromagnetic/hydraulic clutch 102*c*. It is noted that since, at this time, the engine 23 stops and the oil pump 4 is not driven, the hydraulic clutch part of the electromagnetic/hydraulic clutch 102*c* is not engaged.

At a step 1208, the control unit C1 makes the motor/generator 102*b* operated as the motor.

At a step 1209, it is confirmed that the engine start is confirmed from the engine speed.

At a step 1210, the control unit C1 stops the operation of the motor/generator 102*b* as the motor.

At a step 1212, the control unit C1 outputs the switch signal to switch the forward-rearward switching mechanism 103 to be in the D range.

That is to say, in a case where the engine restart processing is carried out, i.e., in a case where the engine 23 is restarted with the engine 23 stopped, the following three situations may occur. First one is the vehicular velocity (Vs) which indicates the deceleration state from 3.5 Km/h to 40 km/h, the other is that the A/T position is in the "D" range, and the engine 23 has stopped. In this situation, the routine goes to the step 1315 for the deceleration and the re-acceleration processing.

The second one is the case where the vehicular velocity falls in a range from zero to 3.5 Km/h, the A/T position is in the D range and the engine 23 stops. This situation indicates the state where the motor creep process is executed.

At this time, if the accelerator is operated and SOC>SET, the control unit C1 determines if the moderate acceleration or the abrupt acceleration occurs according to the opening angle of the accelerator. If the abrupt acceleration occurs, the routine is transferred to the acceleration processing 700 from the motor creep shown in FIG. 8. The reason of determining again SOC>SET is that the background job is carried out so that a regular interrupt processing and event-driven interrupt processing are repeated in the background job.

It is considered that even if the creep process is being executed, the other processing is transferred so as to be returned to the creep process again. In other words, it is considered that since each processing can mutually independently be situation confirmed by itself, the other processes than the motor creep are sequentially executed even if the control unit C1 runs in the motor creep mode.

When the moderate acceleration occurs, the control unit C1 outputs the signal to switch the forward-rearward switching mechanism 103 from the D range to the N range and, once, releases the connection between the drive axle 17 and the transmission 104.

Next, with the electromagnetic/hydraulic clutch 102*c* connected, the motor/generator 102*b* functioning as the starter, and the engine 23 started (operated as the motor), and the confirmation of the engine start made from the engine speed, the function of the motor/generator from the engine speed, the function of the motor/generator 102 as the starter is stopped.

The connection of the electromagnetic/hydraulic clutch 102*c* is released, the signal to switch the forward-rearward switching mechanism 103 from the N range to the D range is outputted, the drive axle 17 is connected to the transmission 104, and the vehicle is transferred to the normal engine driven state.

FIG. 16(*b*) shows the timing chart on the control flow.

It is noted that the reason of switching as D→N→D in the forward-rearward switching mechanism 103 during the engine start is that a torque variation due to the engine start is transmitted to the drive wheel so that the disagreeable feeling is not given to the vehicular driver.

Figure 22:
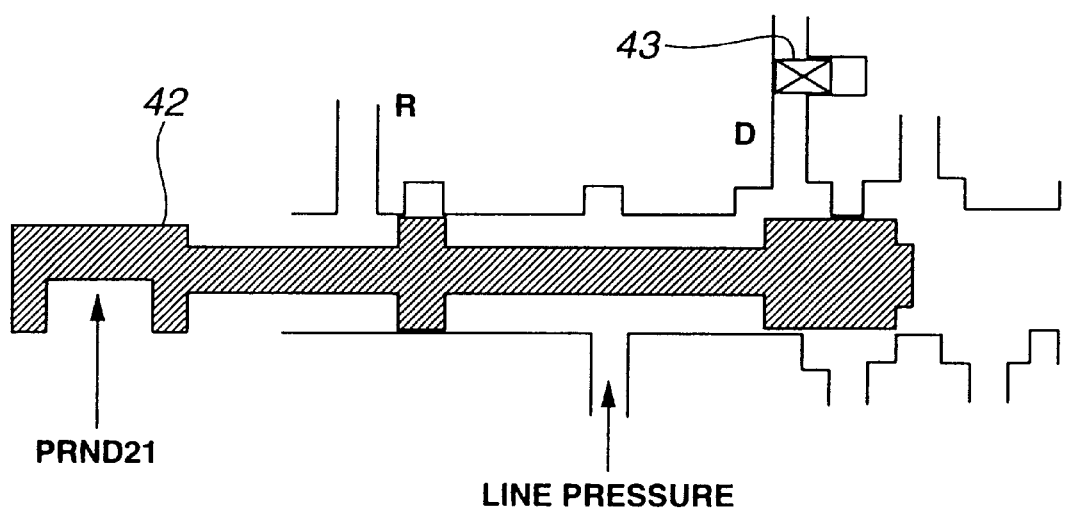
FIG. 22 is a cross sectional view of a shift valve in the case of the first preferred embodiment according to the present invention.

FIG. 22 shows a structure of a shift valve 42 to make the D→N→D switching operation in the forward-rearward switching mechanism 103.

FIG. 22 shows a structure of the shift valve 42 to perform the switching sequence as D→N→D in the forward-rearward switching mechanism portion 103. The shift valve 42 is connected to a shift lever (which determines the A/T position described above but not shown in the drawings).

On the basis of a manipulation on the shift lever, each position on the lever positions of "P (Parking)", "R (Reverse)", "N (Neutral)", "D (Drive)", "2nd (Second), and "1st (First)" can be switched. When the shift valve 42 is placed at the "D" range, a line pressure is supplied to an oil passage shown by D in FIG. 22. When the shift valve 42 is placed at the "R" range, the hydraulic (oil pressure) is supplied to an oil passage denoted by R shown in FIG. 22. Upon receipt of the hydraulic pressure signal the forward-and-rearward movement switching mechanism 103 is constructed to switch the forward-and-rearward movement. In addition, at the "N" range, no line pressure is supplied to any oil passage shown in FIG. 22.

An electromagnetic valve 43 is disposed in a midway through the oil passage denoted by D. When the electromagnetic valve 43 is not driven, the line pressure is supplied to the oil passage shown by D. When the electromagnetic valve 43 is driven, the oil passage denoted by D is closed so that the signal of "N" range is outputted with respect to the forward-rearward switching mechanism 103. If a gear shift range is modified as D→N→D according to the process of the steps 1206 and 1212, the switching from D to N drives the electromagnetic valve 43. The switching from N to D is carried out by the stop of the drive through the electromagnetic valve 43. Since the electromagnetic valve 43 is installed as shown in FIG. 22, a high response characteristic switching of D→N→D can be made.

A third one is such that it is transferred in the motor creep state. This state may be such a state that the brake is in the on state and, thereafter, the brake is in the off state immediately after the vehicular velocity Vs indicates 0 km/h. Then, the engine 23 stops with the A/T position in the D range. At this time, after the re-confirmation that SOC>SET, the same processing as the restart processing from the motor creep is executed.

Figure 14:
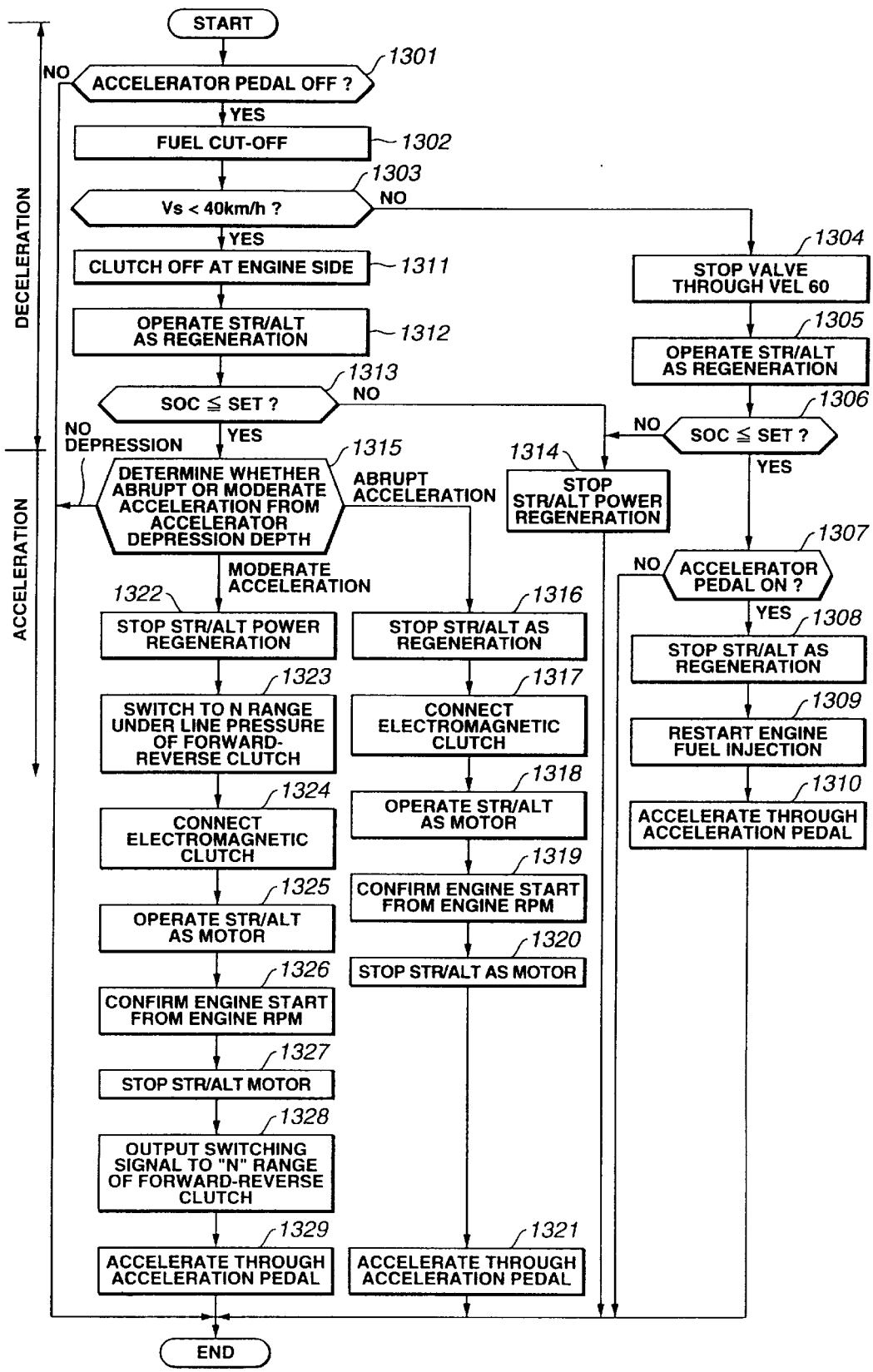
FIG. 14 is an operational flowchart for explaining the deceleration-and-re-acceleration processing in the case of the first embodiment of the motor/generator unit.

FIG. 14 shows a deceleration, re-acceleration processing when the switching is transferred from the deceleration state to the acceleration state.

At a step 1301, the control unit C1 determines whether the accelerator is in the off state.

If Yes at the step 1301, the routine goes to a step 1302. If No at the step 1301, the present routine is ended. At the step 1302, the control unit C1 outputs the control unit C2 to cut off the fuel supply (fuel injection) to the engine 23.

Then, the routine goes to a step 1303. At the step 1303, the control unit C1 determines whether the vehicular velocity Vs is equal to or higher than 40 Km/h. If Yes at the step 1303, the routine branches to a step 1304. At the step 1304, the control unit C1 outputs the control signal to the control unit C2 to fully close the intake and exhaust valves through the VEL 60. At the step 1305, the control unit C1 outputs the control signal to perform the regeneration through the motor/generator 102b.

At the step 1306, the control unit C1 determines whether SOC falls in the set value (SOC≦SET). If Yes at the step 1306, the routine goes to a step 1307. If No at the step 1306, the routine goes to a step 1314.

At the step 1307, the control unit C1 determines if the accelerator is in the off state. If yes at the step 1307, the routine goes to a step 1308. If No at the step 1307, the present routine is ended. At the step 1308, the control unit C1 outputs the control signal to stop the regeneration by the motor/generator 102b.

At the next step 1309, the control unit C1 resumes the fuel injection by the engine 23.

At the next step 1310, the control unit C1 carries out the normal acceleration processing in response to the manipulation of the accelerator by means of the engine 23.

At the step 1311, the control unit C1 outputs the control signal to release the engagement (connection) of the electromagnetic/hydraulic clutch 102c.

At the step 1312, the control unit C1 outputs the control signal to perform the regeneration by means of the motor/generator 102b.

At the next step 1313, the control unit C1 determines whether SOC≦SET.

If Yes (SOC≦SET) at the step 1313, the routine goes to a step 1315.

If No (SOC>SET) at the step 1313, the routine branches to the step 1314.

At the step 1314, the control unit C1 outputs the control signal to stop the regeneration by means of the motor/generator 102b.

At the step 1315, the control unit C1 determines whether the present vehicular running state is in the abrupt acceleration or in the moderate acceleration from the opening angle of the accelerator.

If the abrupt acceleration is resulted, the routine goes from the step 1315 to a step 1322.

At the step 1316, the control unit C1 outputs the control signal to stop the regeneration by means of the motor/generator 102b.

At the next step 1317, the control unit C1 outputs the control signal to connect (engage) the electromagnetic/hydraulic clutch 102c.

In this case, both of the electromagnetic portion and the hydraulic portion are engaged.

At the next step 1318, the control unit C1 outputs the control signal to operate the motor/generator 102b as the motor.

At the step 1319, the control unit C1 confirms the engine start from the engine speed.

At the step 1320, the control unit C1 is operated to stop the motor/generator 102b which is functioning as the motor.

At the next step 1321, the control unit C1 is operated to carry out the normal acceleration in response to the accelerator manipulation.

On the other hand, at the step 1322, the control unit C1 is operated to stop the regeneration through the motor/generator 102b.

At the step 1323, the control unit C1 outputs the control signal to change the gear range to "N" range at the forward-rearward switching mechanism 103.

At the step 1324, the control unit C1 outputs the control signal to connect the electromagnetic/hydraulic clutch 102c.

At the step 1325, the control unit C1 outputs the control signal to operate the motor/generator 102b as the motor.

At the step 1326, the control unit C1 confirms the start of the engine from the engine speed.

At the step 1327, the control unit C1 outputs the control signal to stop the motor/generator 102b as the motor.

At the step 1328, the control unit C1 outputs the control signal to change the gear range to "D" range at the forward-and-rearward switching mechanism 103.

At the step 1329, the control unit C1 outputs the control signal to perform the normal acceleration in response to the accelerator manipulation through the engine 23.

That is to say, when the accelerator is in the off state and the vehicular running state is in the deceleration state, the fuel supply (fuel injection) is cut off.

If the vehicular velocity Vs is equal to or higher than 40 Km/h, the control unit C1 outputs the control signal to stop the intake and exhaust valve operations so as to fully close the intake valve 51 so that each engine cylinder is held in a completely closed state. Hence, when the engine 23 falls in an engine brake (effecting) state so that each engine cylinder is held in a completely closed state. Hence, when the engine 23 falls in an engine brake state so that the power is transmitted from the output axle 13 to the crankshaft 18 (output axle 13→crankshaft 18). When the piston is driven, the air flow-in and flow-out of each cylinder becomes nullified so that the energy loss due to the movement of air becomes eliminated and the brake force corresponding to the engine braking is reduced.

The regeneration of the motor/generator 102b compensates for this energy loss so that the regeneration can be carried out without giving the disagreeable feeling to the vehicular driver. If SOC≦SET, the regeneration operation through the motor/generator 102b is stopped.

If SOC≦SET and the accelerator is in the on state, viz., the vehicular running state is transferred into the acceleration state, the regeneration stops, the engine fuel injection is resumed, and the vehicle is accelerated in response to the manipulation of the accelerator in the usual way as the engine drive condition.

Figure 20:
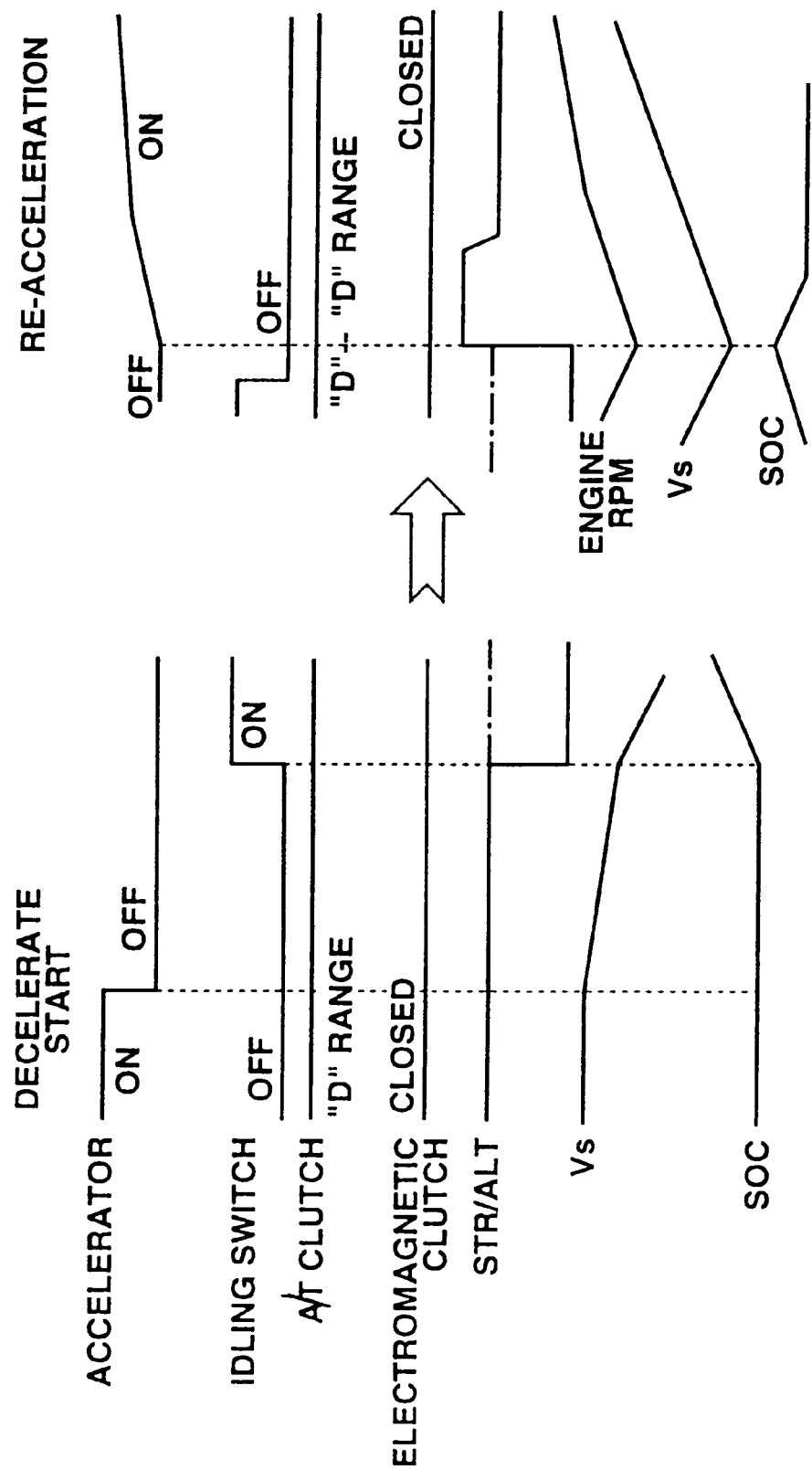
FIG. 20 is an integrally timing chart for explaining a deceleration-and-re-acceleration processing without an engine brake regeneration in the case of the first embodiment.

FIG. 20 shows an integral timing chart for the above-described control flow.

In addition, in the vehicular deceleration state, when the vehicular velocity Vs is equal to or lower than 40 Km/h, the engagement of the electromagnetic/hydraulic clutch 102c is released and the regeneration by means of the motor/generator 102b is carried out.

At this time, since no linkage between the engine 23 and the motor/generator 102b occurs, it is possible to perform the regeneration corresponding to the engine brake.

When the vehicular running condition is transferred from the deceleration state to the acceleration state, the control unit C1 determines the vehicular running condition is in the abrupt acceleration or the moderate acceleration. If the abrupt acceleration occurs, the regeneration operation by means of the motor/generator 102b is stopped and the electromagnetic/hydraulic clutch 102c is connected.

At the present stage, the motor/generator 102b is operated as the motor so as to perform the function of the starter for the engine 23.

After the confirmation of the engine start from the engine speed, the control unit C1 stops the function of the motor/generator 102b as the motor/engine starter. In the same way as the normal engine drive, the vehicle is accelerated in response to the accelerator manipulation.

This control is basically the same as the case of the control from the motor creep to the abrupt acceleration in the acceleration processing, as shown in FIG. 8.

In the first embodiment, the engine 23 is stopped during the regeneration. In this case, the hydraulic required for the transmission 105 is supplied from the hydraulic generator additionally installed. In a case where the engine stop is not carried out (only the fuel injection (supply) cut off), the hydraulic generator is not required.

The hydraulic generator can include a motor-driven pump and/or an accumulator to reserve the hydraulic.

In a case where the moderate acceleration occurs, the control unit C1 is operated to stop the regeneration through the motor/generator 102b, the gear range is changed to "N" range at the forward-rearward switching mechanism 103. With the connection to the drive axle 17 released, the electromagnetic/hydraulic clutch 102b is connected, the motor/generator 102b is operated as the starter, and the engine start is confirmed.

Thereafter, the function of the motor/generator 102b as the starter is stopped, the switching of "D" range at the forward-rearward switching mechanism 103 is made, the connection of the motor/generator 102b as the starter is stopped, the switching of the forward-rearward switching mechanism 103 is made to the "D" range, the connection to the drive axle 17 is carried out, and the normal accelerator acceleration by means of the engine 23 is carried out. This switching sequence as D→N→D is basically the same as the control flow of the steps 1205 through 1212 shown in FIG. 13. However, as compared with the case at the step 1324 in the deceleration and re-acceleration process described above with reference to FIG. 13, there is a difference point in that the electromagnetic/hydraulic clutch 102c is connected (engaged). This is because a sufficient hydraulic (pressure) is secured during the vehicular run.

Figure 18:
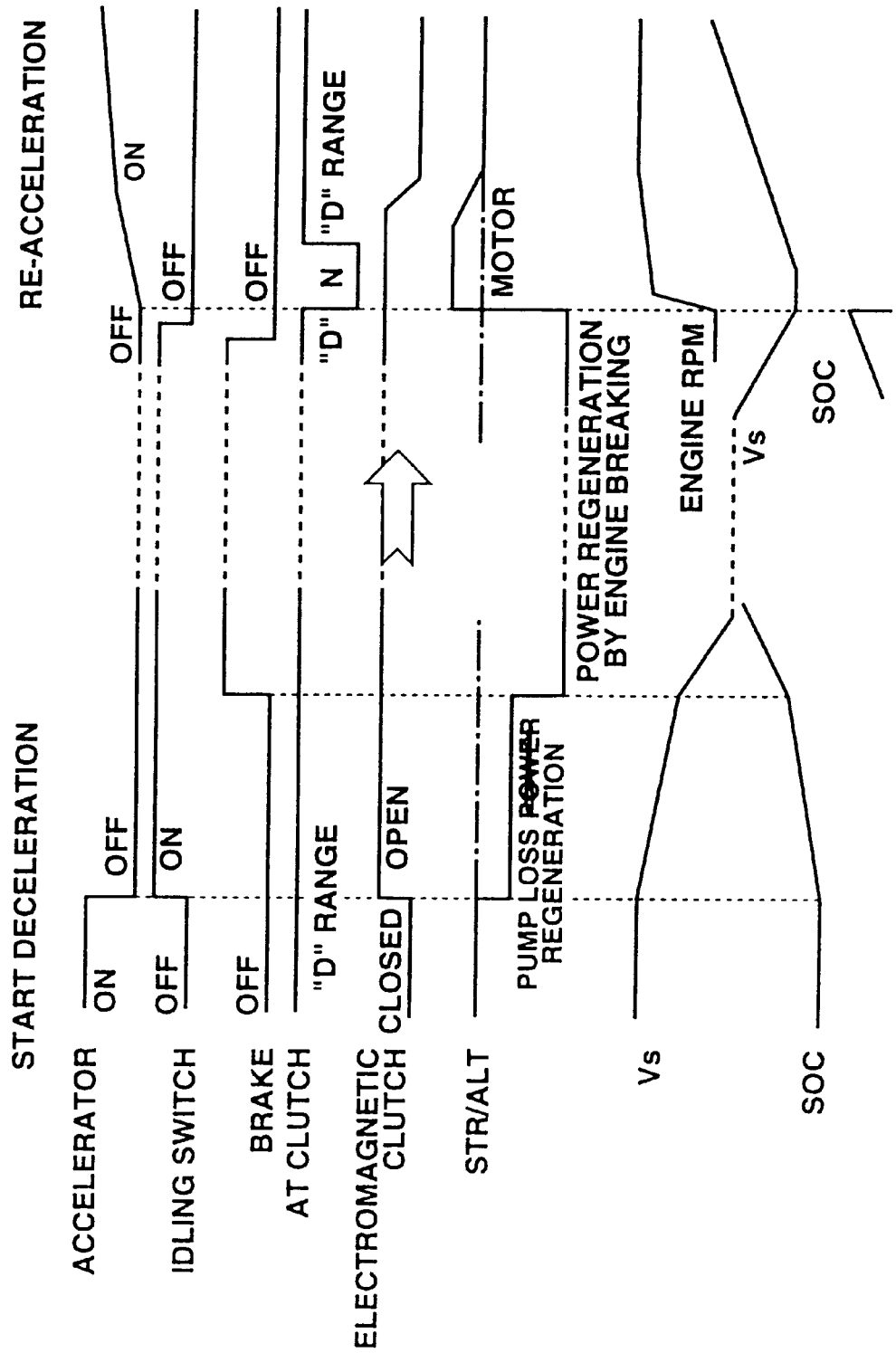
FIG. 18 is an integrally timing chart for explaining the deceleration-and-re-acceleration processing during the regeneration of an engine brake in the first preferred embodiment.

FIG. 18 shows a timing chart of the control flows in the process between the steps 1322 and steps 1329.

As described above, in the first embodiment according to the present invention the electromagnetic/hydraulic clutch 102c in which the hydraulic clutch and the electromagnetic clutch are juxtaposed to each other as the clutch to render the torque converter 102a in the lock-up state and the motor/generator 102b is installed within the outer housing 5. Even though the motor/generator 102b is relatively disposed toward the transmission 105 to the torque converter 102a having the electromagnetic/hydraulic clutch 102c, the electromagnetic portion is engaged according to its necessity even under the condition such that the hydraulic clutch portion of the clutch 102c is not engaged, so that the engine 23 and the motor/generator 102b can be linked together. Hence, the motor/generator 102b can exhibit the function of any of the starter (for the engine 23), the alternator, the drive assistance, and the regeneration device. In addition, it is not necessary to modify remarkably the already present and normally available power train and to modify remarkably the production line. Thus, the motor/generator unit 102 can achieve a low cost product.

Furthermore, since the housing of the torque converter 102a has the same structure as the product already present and normally available, it becomes possible to set two types of the specifications that the presently available torque converter 102a is directly used without adding the motor/generator unit 102 thereinto and that the torque converter 102a into which the motor/generator unit 102 is installed. Consequently, a degree of freedom in design can be achieved.

In addition, when the torque converter 102a is made in the lock-up state, both of a bending vibration and a torsional vibration are inputted to a torque converter 102a from both of the engine and the transmission. At this time, these vibrations can be absorbed by means of the flexible plate 14 and the torsional spring 15. Hence, it becomes difficult to generate the relative displacement in a direction orthogonal to the axis between the rotor 8 and the outer housing 5 linked to the drive axle 17 outputted from the torque converter 102a. Therefore, it becomes difficult to interfere against each other between the rotor 8 and the stator 1 in the motor/generator 102b even if an interval of distance between the rotor 8 and the stator 1 is narrowed An input/output efficiency in the motor/generator 102b can be improved.

In addition, since the rotor supporting member 8a is installed, a length of a radial direction and an axial direction can be secured. Hence, if becomes possible to enlarge the drive capacity and the capacity of regeneration.

In addition, since the fin 6 is installed on the rotor supporting member 8a, a functional reduction of the motor/generator 102b due to the heat generated on the motor/generator 102b can be prevented from occurring. This jacket to cause the cooling medium to flow onto the outer housing 5 is installed on the outer housing 5. This causes the stator 1 to be cooled so that the reduction in function of the motor/generator 102b cannot occur.

Since the built-in oil pump 4 is installed, it is not necessary to install the oil pump external to the converter housing and the structure can be compacted.

Even in a case where the engine 23 is directly coupled to the drive axle 17 on which the motor/generator 102b is installed by means of the electromagnetic/hydraulic clutch 102c, a resistance at the engine side is dropped by the quantity by which the energy loss of the engine 23 due to the stop of the valves through the VEL 60 is suppressed and the regeneration is carried out by the quantity by which the resistance is dropped. Consequently, the regeneration can be carried out without giving the vehicular driver disagreeable feeling for the driving of the vehicle and the regeneration capability can be improved. That is to say, since, with the direct coupling between the engine 23 and the motor/generator 102b, the brake force corresponding to the regeneration is developed in addition to the normal engine brake and, therefore, the drive force is increased so that the vehicular driver gives the disagreeable feeling to the vehicular driver.

However, in the first embodiment, in the direct coupling state, the energy loss of the engine 23 is suppressed to reduce the brake force from the engine brake and the regeneration is carried out by the quantity corresponding to this reduction. The total brake force, thus, corresponds to the engine brake so that no disagreeable feeling is given to the vehicular driver.

Second Embodiment

Figure 23:
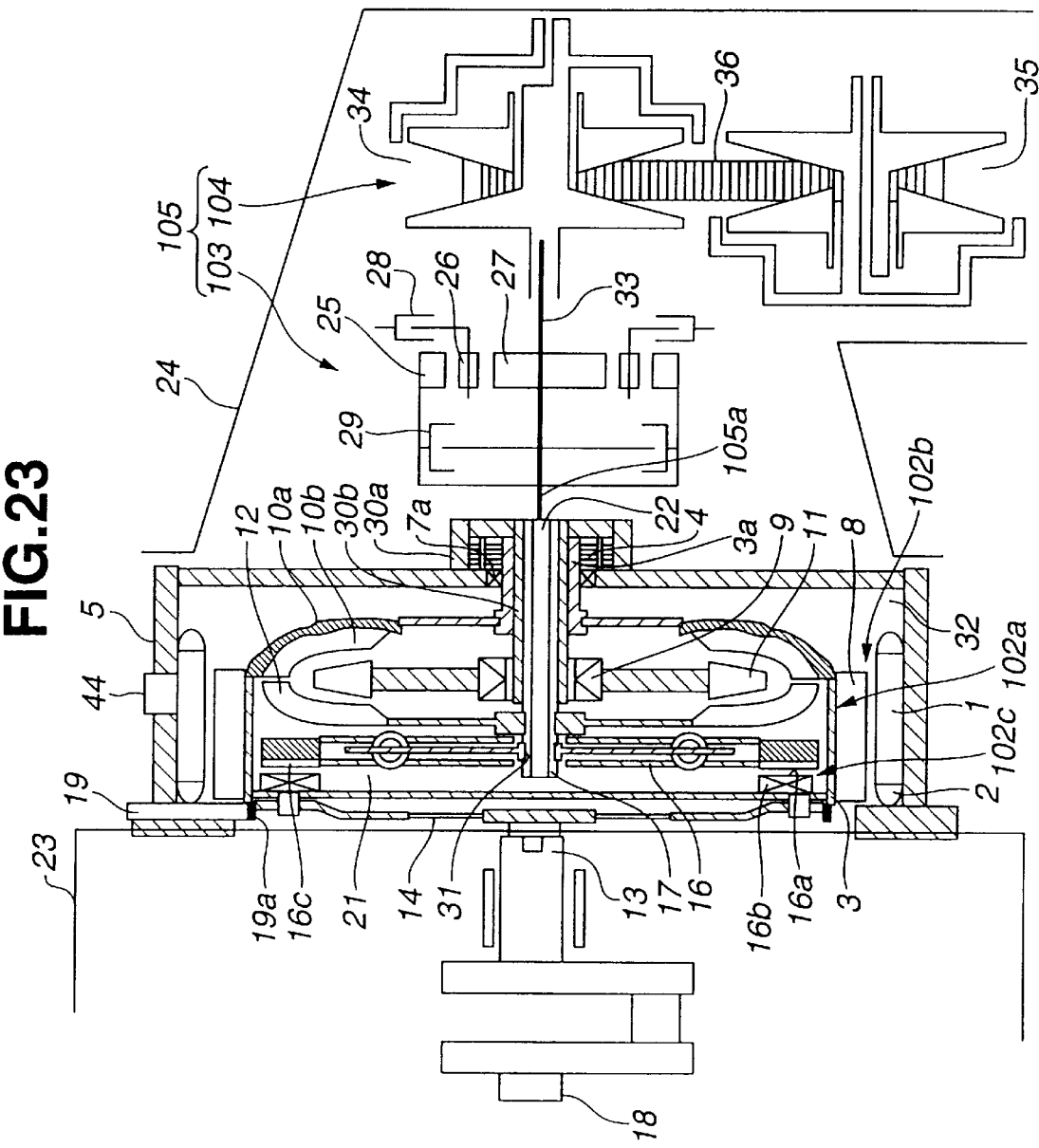
FIG. 23 is a cross sectional view of a whole configuration of the motor/generator unit in a second preferred embodiment according to the present invention.

FIG. 23 shows a cross sectional view of representing a second preferred embodiment of the motor/generator unit 102b according to the present invention.

Since the basic structure is the same as that of the first embodiment and the difference point from the first embodiment is only the position at which the motor/generator 102b is installed. The same reference signs as the like structures are used so that the detailed description thereof are omitted and only the difference point will be described below.

That is to say, the rotor 8 of the motor/generator 102b is installed within the converter case 3 of the torque converter 102a. In addition, the oil pump 4 is disposed on the outer housing 102a. Hence, in the second embodiment, it is not necessary to install the inner housing 30 as described in the first embodiment. Consequently, a simpler structure can be achieved. The motor/generator unit 102 in the second embodiment can be installed in the vehicle without modification of the axial length of a module constituting the torque converter 102a used in the conventional vehicle.

Next, the control flow in the motor/generator unit in the second embodiment which is mounted in the vehicle will be described below. This control flow will be described only on the difference point in the second embodiment from that described in the first embodiment.

Figure 24:
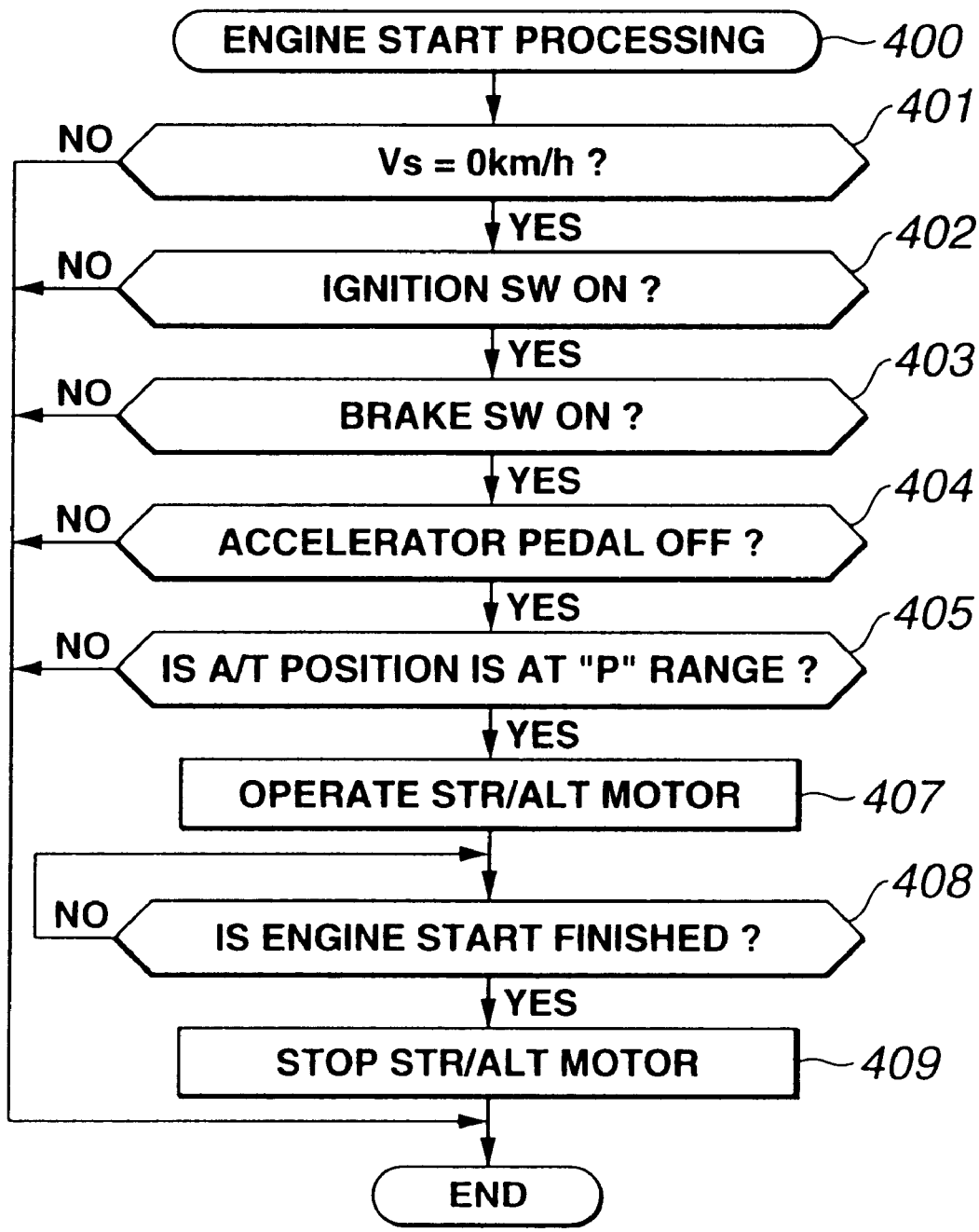
FIG. 24 is an operational flowchart for explaining an engine re-start processing in the second preferred embodiment according to the present invention.

FIG. 24 shows the engine start processing in the motor/generator unit in the case of the second embodiment.

In the second embodiment, the rotor 8 of the motor/generator 102b is disposed on the converter cover 3 and the motor/generator 102b is directly coupled to the engine 23.

Hence, in a case where the engine 23 is started, after confirming that the vehicular velocity (Vs) indicates 0 km/h, the ignition switch is turned on, the brake switch is in the off state, the accelerator is in the off state, and the A/T position is in the "P" range at the steps 401 through 405, the motor/generator 102b is caused to function as the starter. Upon the confirming that the engine has started, the motor/generator 102b which is functioning as the starter (motor) is stopped.

Hence, as compared with the case where the engine start processing is executed in the first embodiment, the contents of the steps 406 and 401 are not needed and are eliminated. The second preferred embodiment is largely different from the first embodiment in that it is not necessary to connect the lock-up clutch when the motor/generator 102b is caused to function as the starter. This is because the motor/generator 102b is integrally installed on an outside of the converter cover 3 (refer to FIG. 23).

Figure 25:
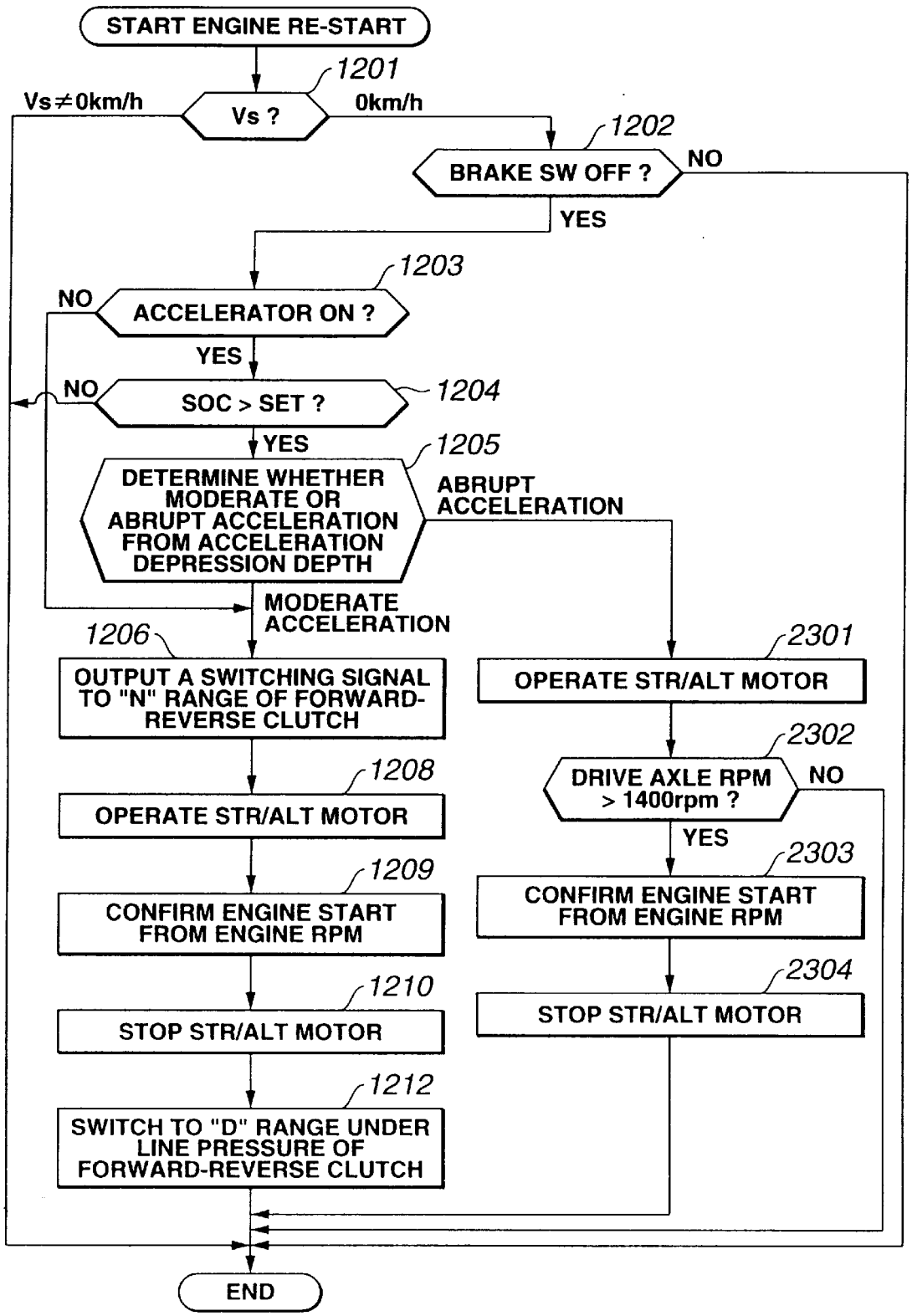
FIG. 25 is an operational flowchart for explaining the engine re-start processing in the second embodiment according to the present invention.

FIG. 25 shows a flowchart on the engine restart processing executed in the case of the second preferred embodiment. The difference point from the steps shown in FIG. 13 described in the first embodiment is that at the step 2301 the motor/generator 102b is operated to function as the motor.

At the step 2302, the control unit C1 determines if the revolution speed of the output axle 13 of the engine 23 is equal to or higher than 1400 rpm.

If Yes at the step 2302, the routine goes to a step 2303. If No at the step 2302, the present routine is ended. At the step 2303, the control unit 11 confirms that the engine has started from the engine speed.

At the step 2304, the control unit C1 is operated to stop the motor/generator 102b functioning as the motor.

In the second embodiment, the case where the vehicular engine 23 stops with the A/T position in the "D" range means that, in the engine idling state, the brake pedal is depressed and the vehicular velocity Vs is 0 km/h.

When the brake pedal is released from the abovedescribed state, the accelerator is manipulated (in the ON state), and SOC>SET. At this time, the control unit C1 determines if the abrupt acceleration or moderate acceleration occurs from the accelerator manipulation variable (depression depth or opening angle).

In the case of the occurrence of the moderate acceleration, the control unit C1 confirms that the forward-rearward switching mechanism 103 is switched into the "N" range. Then, the motor/generator 102b is operated to function as the starter and the forward-rearward switching mechanism 103 is changed to the "D" range to complete the engine re-start. The difference point from those steps described in the first embodiment is that it is not necessary to connect the electromagnetic/hydraulic clutch 102c. When the motor/generator 102b is revolved as the starter, the pump impeller 10 is simultaneously revolved.

Hence, the augmented start torque is transmitted to the turbine runner 12. Consequently, a smooth start of the engine can be achieved.

In the case of the determination that the abrupt acceleration occurs, the motor/generator 102b is caused to function as the starter and is utilized as an initial drive source so that a sufficient torque can be outputted to the drive axle 17 via the torque converter 102a.

If the revolution speed of the engine output axle 13 is equal to or higher than 1400 rpm, the engine start is confirmed from the engine speed and the motor/generator 102b as the starter is stopped. Consequently, the smooth response to the driver's demand can be achieved without loss of the highly responsive characteristic demanded during the abrupt acceleration.

Figure 26:
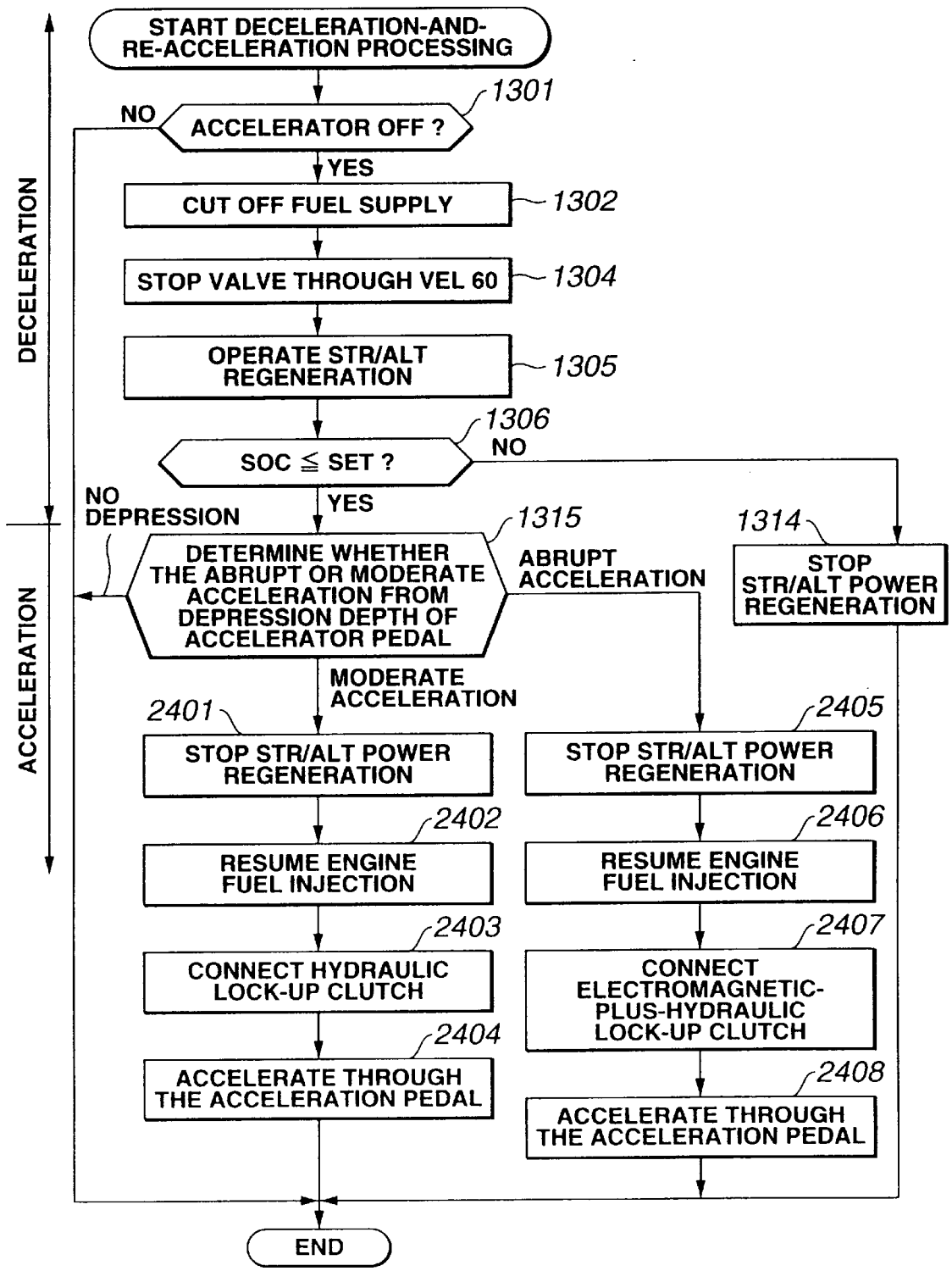
FIG. 26 is an operational flowchart for explaining the deceleration-and-re-acceleration processing in the second embodiment according to the present invention.

FIG. 26 shows a flowchart for the deceleration-and-re-acceleration process when the vehicular running condition is transferred from the deceleration to the acceleration states.

It is noted that contents of steps which are different from those shown in FIG. 14 in the case of the first embodiment will be described below.

At a step 2401, the control unit C1 is operated to stop the regeneration through the motor/generator (STR/ALT 105b).

At a step 2402, the control unit C1 is operated to resume the fuel injection through the engine 23.

At a step 2403, the control unit C1 is operated to connect the electromagnetic/hydraulic clutch 102c.

At a step 2404, the control unit C1 is operated to perform the normal acceleration in response to the accelerator manipulation.

At a step 2405, the control unit C1 is operated to stop the regeneration by means of the motor/generator 102b.

At a step 2406, the control unit C1 is operated to resume the fuel injection through the engine 23.

At a step 2407, the control unit C1 is operated to connect the electromagnetic/hydraulic clutch 102c.

At a step 2408, the control unit C1 is operated to perform the acceleration in response to the accelerator manipulation through the engine 23.

In the second embodiment, during the deceleration, the fuel supply (fuel injection) is cut off, the valve operating mechanism, viz., the valve operation is stopped through the VEL 60, and the regeneration through the motor/generator 102b is carried out to recover the pump loss. This series of operation is the same as described in the first embodiment.

However, since, in the second embodiment, the rotor 8 is installed on the converter cover 3 and the engine is always linked to the motor/generator 102b, the regeneration corresponding to the engine friction is not carried out.

In addition, since the control over the lock-up release is referred to the vehicular velocity Vs, there are two states one of which is the release of the engagement of the electromagnetic/hydraulic clutch 102c and the other of which is the continuation of the engagement thereof.

In the engagement state, the regeneration operation is continued.

At a time point at which the release operation is carried out, the regeneration is not carried out.

When the vehicular running state is transferred from the deceleration to the acceleration, the control unit C1 determines if the present acceleration is the abrupt or moderate acceleration. In the case of the abrupt acceleration, the control unit C1 is operated to stop the regeneration through the motor/generator 102c, to resume the fuel injection for the engine 23, to connect the electromagnetic/hydraulic clutch 102c, and to perform the manual acceleration in response to the accelerator manipulation.

In a case where the routine shown in FIG. 26 goes to the step 2407 with the electromagnetic/hydraulic clutch 102c connected, the control unit jumps over the step 2407 to the step 2408.

In addition, the reason of engaging the electromagnetic/hydraulic clutch 102c is to cope positively with an abrupt torque variation during the abrupt acceleration.

On the other hand, if the control unit C1 determines that the moderate acceleration occurs, the regeneration through the motor/generator 102b is stopped, the fuel injection for the engine 23 is resumed, only the hydraulic clutch portion of the electromagnetic/hydraulic clutch 102c is connected, and the normal acceleration in response to the accelerator manipulation through the engine 23 is carried out.

It is noted that in a case where the routine shown in FIG. 26 goes to the step 2403 with the electromagnetic/hydraulic clutch 102c connected, the routine in FIG. 26 jumps over the step 2403 to the step 2404. Since, during the moderate acceleration, the abrupt torque variation does not occur, only the engagement of the hydraulic clutch portion of the electromagnetic/hydraulic clutch 102c can cope sufficiently with a moderate torque variation.

As described above, it is possible to make the axial length of the motor/generator unit 102 in the second embodiment exactly the same as the torque converter 102a which is installed in the conventional vehicle so as to be enabled to be an easy installation in the conventional vehicle.

Since the housing is only the one, the manufacturing cost can be suppressed in terms of the production.

It is noted that, in FIGS. 2 and 23, reference numeral 16c denotes a common facing surface of the electromagnetic/hydraulic clutch 102c attached on a peripheral end surface of the lock-up piston 16, reference numeral 16b denotes a coil portion of the electromagnetic clutch portion of the electromagnetic/hydraulic clutch 102b attached on the side surface of the torque converter housing 3, reference numeral 16a denotes an opposing common facing surface of the electromagnetic/hydraulic clutch 102c, reference numeral 19 denotes a flexible hollow pipe to introduce an electrical wire connected to the control unit C1 to the coil portion 16b of the electromagnetic/hydraulic clutch 102c, 19a denotes the electrical wire. It is noted that the control unit C1 is connected to the motor/generator 102c via the power supply portion 44 in FIGS. 2 and 23 (also refer to FIG. 4).

The entire contents of Japanese Patent Applications No. Heisei 11-085378 (filed in Japan on Mar. 29, 1999) are herein incorporated by reference. Although the invention has been described above by reference to certain embodiments of the invention, the invention is not limited to the embodiments described above. Modifications and variations of the embodiments described above will occur to those skilled in the art in the light of the above teachings. The scope of the invention is defined with reference to the following claims.

What is claimed is:

1. A motor/generator unit for an automotive vehicle, comprising:

a torque converter to perform a transmission of a driving force between an output axle of a vehicular engine and an input axle of a transmissions, the transmission being enabled to switch between a neutral state and a forward-and-rearward state and being enabled to vary a gear ratio;

a housing enclosing a periphery of the torque converter;

a hydraulic clutch;

an electromagnetic clutch, both of the hydraulic clutch and electromagnetic clutch being juxtaposed to be enabled to form a lock-up state of the torque converter; and a motor/generator including a stator fixed to the housing and a rotor attached to a rotary element of the torque converter so as to be opposed to the stator, the motor/generator being disposed to be enabled to give and receive a torque to and from the rotary element of the torque converter.

2. A motor/generator unit for an automotive vehicle as claimed in claim 1, wherein both the hydraulic clutch and electromagnetic clutch have common facing surfaces.

3. A motor/generator unit for an automotive vehicle as claimed in claim 1, wherein the rotor of the motor/generator is disposed toward the input axle of the transmission with respect to the torque converter and both of the electromagnetic and hydraulic clutches.

4. A motor/generator unit for an automotive vehicle as claimed in claim 3, further comprising a control unit configured to engage the electromagnetic clutch to have the motor/generator function as a starter for the engine during an engine start and configured to release the engagement of the electromagnetic clutch and to stop a drive of the engine under an established condition of a release from the engagement of the hydraulic clutch during a regeneration through the motor/generator.

5. A motor/generator unit for an automotive vehicle as claimed in claim 4, wherein an electromagnetically-powered valve operating apparatus is installed on the engine and wherein the control unit is configured to stop a valve operation through the electromagnetically-powered valve operating apparatus to hermetically seal air within each cylinder of the engine so as to prevent a loss in a movement energy involved in air flow-in and flow-out to and from each cylinder and to regenerate an energy corresponding to the loss when the torque converter is in the lock-up state during the regeneration through the motor/generator.

6. A motor/generator unit for an automotive vehicle as claimed in claim 5, wherein the control unit is configured to determine whether a vehicular running state is in a steady state running state and to have the motor/generator function as an alternator during the steady state running state.

7. A motor/generator unit for an automotive vehicle as claimed in claim 3, wherein the housing is an outer housing attached onto the engine so as to enclose the torque converter, the motor/generator, and both of the electromagnetic and hydraulic clutches and further comprising an inner housing attached onto the engine to divide an inner space thereof into a chamber for the torque converter and a chamber for the motor/generator and a drive axle penetrating the inner and outer housings toward the input axle of the engine and connected to the input axle of the transmission.

8. A motor/generator unit for an automotive vehicle as claimed in claim 7, wherein a rotor supporting member is axially supported on the drive axle and extends along an outer periphery of the inner housing toward an inner peripheral surface of the outer housing and the stator is attached on the inner periphery of the outer housing so as to face against the rotor.

9. A motor/generator unit for an automotive vehicle as claimed in claim 8, further comprising a fin attached onto a side surface of the rotor supporting member of the motor/generator so as to face against the inner housing.

10. A motor/generator unit for an automotive vehicle as claimed in claim 9, further comprising a flexible plate attached onto the output axle of the engine and the torque converter to absorb a vibration developed on the output axle of the engine.

11. A motor/generator unit for an automotive vehicle as claimed in claim 10, further comprising a torsion spring attached onto a lock-up piston of the torque converter to absorb a torsional vibration developed on the drive axle, the lock-up piston being axially supported on the drive axle via a serration coupling.

12. A motor/generator unit for an automotive vehicle as claimed in claim 11, further comprising a jacket through which a cooling medium is passed, the jacket being disposed on a fixed contact surface between the stator of the motor/generator and the inner peripheral surface of the outer housing.

13. A motor/generator unit for an automotive vehicle as claimed in claim 12, further comprising a built-in oil pump attached onto the drive axle and located at the chamber for the motor/generator.

14. A motor/generator unit for an automotive vehicle as claimed in claim 13, wherein the common facing surface of both of the electromagnetic and hydraulic clutches is attached onto a peripheral end of the lock-up piston.

15. A motor/generator unit for an automotive vehicle as claimed in claim 14, wherein the drive axle has a hollow structure to form an oil passage through which a hydraulic is supplied to an oil chamber formed in the torque converter.

16. A motor/generator unit for an automotive vehicle as claimed in claim 14, wherein the rotor of the motor/generator is disposed toward the input axle of the engine with respect to the torque converter and both of the electromagnetic and hydraulic clutches.

17. A motor/generator unit for an automotive vehicle as claimed in claim 16, wherein the housing is an outer housing attached onto the engine so as to enclose the torque converter, the motor/generator, and both of the electromagnetic and hydraulic clutches and wherein the torque converter includes a torque converter cover on an outer peripheral surf ace of which the rotor of the motor/generator is attached so as to face against the stator thereof.

18. A motor/generator unit for an automotive vehicle as claimed in claim 17, wherein the torque converter cover is axially supported on a drive axle and further comprising a built-in pump disposed at an outside of the outer housing and axially supported on the drive axle.

19. A motor/generator unit for an automotive vehicle as claimed in claim 18, wherein the transmission is a continuously variable transmission.

20. A motor/generator unit for an automotive vehicle as claimed in claim 17, further comprising a control unit configured to have the motor/generator function as a starter for the engine without an engagement of the electromagnetic clutch during an engine start and configured to engage the electromagnetic clutch during a regeneration through the motor/generator.

* * * * *